US012737919B2

(12) United States Patent
Zhou et al.

(10) Patent No.: US 12,737,919 B2
(45) Date of Patent: Sep. 15, 2026

(54) METHOD AND APPARATUS OF HIERARCHICAL SEMANTIC MAPPING BASED ON DEEP-LEARNING PERCEPTION

(71) Applicant: INSTITUTE OF INTELLIGENT MANUFACTURING, GUANGDONG ACADEMY OF SCIENCES, Guangzhou (CN)

(72) Inventors: Xuefeng Zhou, Guangzhou (CN); Zerong Su, Guangzhou (CN); Xubin Lin, Guangzhou (CN); Zhihao Xu, Guangzhou (CN); Hongmin Wu, Guangzhou (CN); Guanrong Tang, Guangzhou (CN)

(73) Assignee: INSTITUTE OF INTELLIGENT MANUFACTURING, GUANGDONG ACADEMY OF SCIENCES, Guangzhou (CN)

( * ) Notice: Subject to any disclaimer, the term of this patent is extended or adjusted under 35 U.S.C. 154(b) by 293 days.

(21) Appl. No.: 18/717,825

(22) PCT Filed: Feb. 21, 2023

(86) PCT No.: PCT/CN2023/077313
§ 371 (c)(1),
(2) Date: Jun. 7, 2024

(87) PCT Pub. No.: WO2024/138851
PCT Pub. Date: Jul. 4, 2024

(65) Prior Publication Data

US 2025/0329047 A1 Oct. 23, 2025

(30) Foreign Application Priority Data

Dec. 26, 2022 (CN) ......................... 202211671016.6

(51) Int. Cl.

| | |
|---|---|
| ***G06T 7/73*** | (2017.01) |
| ***G01C 21/16*** | (2006.01) |
| ***G01S 17/89*** | (2020.01) |
| ***G06T 7/12*** | (2017.01) |
| ***G06T 7/33*** | (2017.01) |
| ***G06T 7/55*** | (2017.01) |
| ***G06T 7/64*** | (2017.01) |

(Continued)

(52) U.S. Cl.
CPC ............ *G06T 7/74* (2017.01); *G01C 21/1652* (2020.08); *G01S 17/89* (2013.01); *G06T 7/12* (2017.01);

(Continued)

(58) Field of Classification Search
CPC .... G06T 7/74; G06T 7/64; G06T 7/55; G06T 7/12; G06T 7/337
See application file for complete search history.

(56) References Cited

FOREIGN PATENT DOCUMENTS

| | | |
|---|---|---|
| CN | 109556617 A | 4/2019 |
| CN | 110243370 A | 9/2019 |

(Continued)

OTHER PUBLICATIONS

Chinese Patent Office: Decision of Grant of CN Patent Application No. 202211671016.6 (Related Application); Feb. 23, 2023; 3 Pgs.

(Continued)

*Primary Examiner* — Wednel Cadeau

(57) ABSTRACT

A method and an apparatus for constructing hierarchical semantic map based on deep-learning based perception, a server, a storage medium are provided. The method includes: obtaining 3D point cloud data, scene images and motion state data; projecting 3D point cloud data onto an image plane to obtain a depth image; performing a point cloud registration and a pose prediction on the 3D point cloud data and the motion state data to obtain an odometer pose; generating a point cloud map according to the 3D point cloud data and the odometer pose of multi-sensor system; based on the depth image and the odometer pose of the multi-sensor system, performing an external ellipse fitting process on each semantic region in the depth image to obtain an object-enveloped map for respective object images; fus- (Continued)

ing the coordinately aligned point cloud map and object-enveloped map into a semantic map.

15 Claims, 8 Drawing Sheets

(51) Int. Cl.

| | |
|---|---|
| ***G06V 10/26*** | (2022.01) |
| ***G06V 10/44*** | (2022.01) |
| ***G06V 10/75*** | (2022.01) |

(52) U.S. Cl.

CPC ................ *G06T 7/337* (2017.01); *G06T 7/55* (2017.01); *G06T 7/64* (2017.01); *G06V 10/26* (2022.01); *G06V 10/443* (2022.01); *G06V 10/757* (2022.01); *G06T 2207/10016* (2013.01); *G06T 2207/10028* (2013.01); *G06T 2207/20084* (2013.01); *G06T 2207/20221* (2013.01)

(56) References Cited

FOREIGN PATENT DOCUMENTS

| | | | | | |
|---|---|---|---|---|---|
| CN | 111461245 | A | | 7/2020 | |
| CN | 111476894 | A | | 7/2020 | |
| CN | 111652179 | A | | 9/2020 | |
| CN | 112465903 | A | | 3/2021 | |
| CN | 113034571 | A | | 6/2021 | |
| CN | 113034584 | A | | 6/2021 | |
| CN | 113066105 | A | * | 7/2021 | ............... G06T 7/74 |
| CN | 113160315 | A | | 7/2021 | |
| CN | 113362247 | A | | 9/2021 | |
| CN | 113436260 | A | | 9/2021 | |
| CN | 113888691 | A | | 1/2022 | |
| CN | 114413881 | A | | 4/2022 | |
| CN | 114419147 | A | | 4/2022 | |
| CN | 114526739 | A | | 5/2022 | |
| CN | 114662587 | A | * | 6/2022 | ............. G06F 18/22 |
| CN | 114966734 | A | | 8/2022 | |
| CN | 114972668 | A | | 8/2022 | |
| CN | 114994638 | A | | 9/2022 | |
| CN | 115096286 | A | | 9/2022 | |
| CN | 115187737 | A | | 10/2022 | |
| CN | 115272596 | A | | 11/2022 | |
| CN | 115454055 | A | * | 12/2022 | ........... G05D 1/0221 |
| CN | 115655262 | A | | 1/2023 | |
| WO | 2021129483 | A1 | | 7/2021 | |

OTHER PUBLICATIONS

Chinese Patent Office: Office Action of CN 202211671016.6 (related application); Feb. 7, 2023; 11 pages.

Patent Cooperation Treaty: International Search Report and Written Opinion for PCT/CN2023/077313; Sep. 4, 2023; 10 pages.

* cited by examiner

S151 based on an image coordinate system of each depth image frame, an external ellipse fitting process is performed on each semantic region in each depth image frame to obtain a dual vector of an external ellipse of each semantic region and semantic information

S152 based on the odometer pose of multiple types of sensors, as well as the dual vector and semantic information corresponding to each semantic region, determining a projection matrix of the same external ellipse fitted among respective depth image frames, and determining an object-enveloped map for object images based on the projection matrix

FIG. 7 c1 determining an overlapping inlier of the same external ellipse fitted among respective depth image frames according to odometer pose of multiple types of sensors c2 according to overlapping inliers of depth image frames and dual vectors of corresponding external ellipses, determining a projection matrix of the same external ellipse fitted among depth image frames

FIG. 8

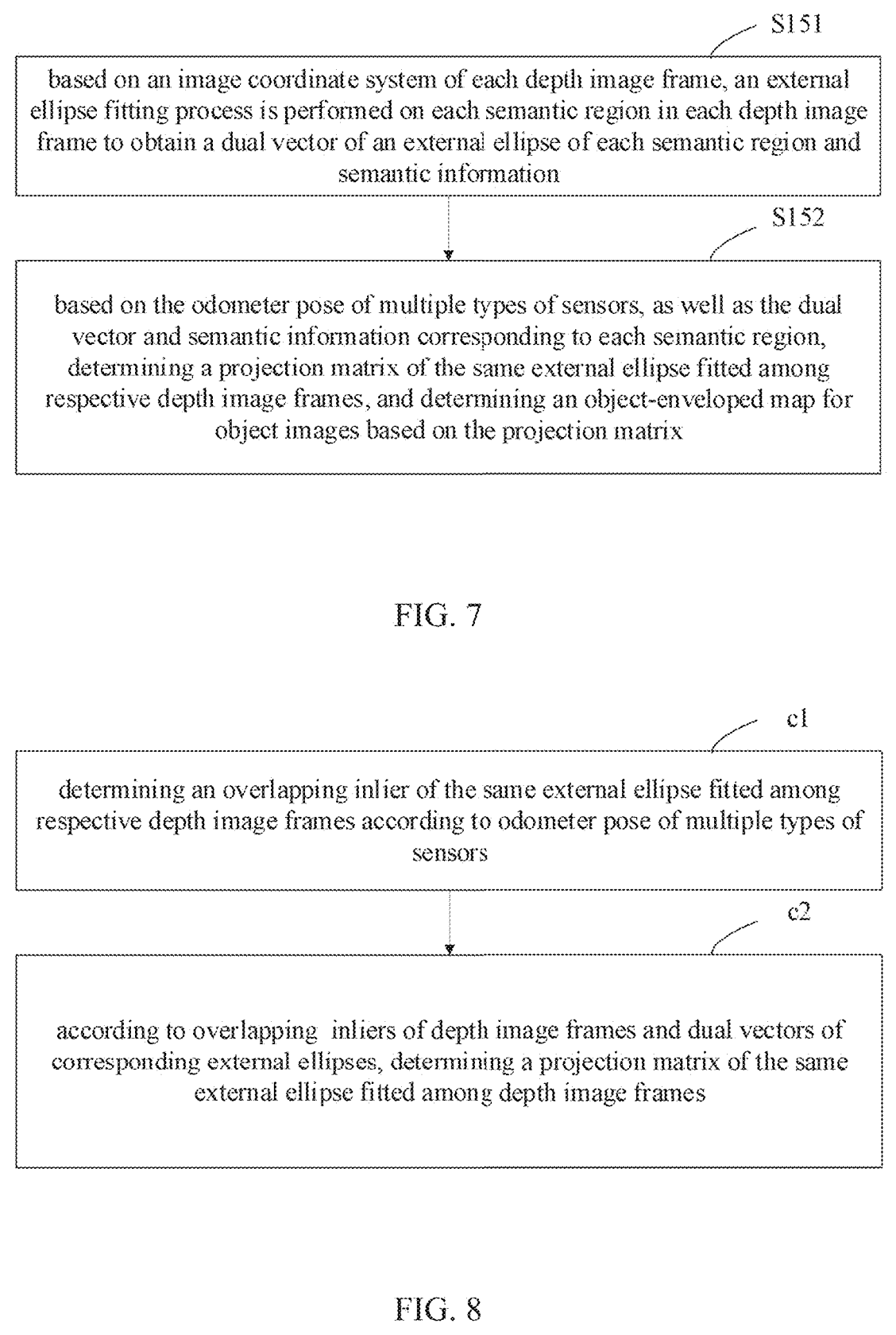

METHOD AND APPARATUS OF HIERARCHICAL SEMANTIC MAPPING BASED ON DEEP-LEARNING PERCEPTION

CROSS REFERENCE TO RELATED APPLICATION

This application is a U.S. National Phase application submitted under 35 U.S.C. § 371 of Patent Cooperation Treaty application serial no. PCT/CN2023/077313 filed on Feb. 21, 2023, and entitled "METHOD AND APPARATUS OF HIERARCHICAL SEMANTIC MAPPING BASED ON DEEP-LEARNING PERCEPTION", which claims priority to Chinese Patent Applications No. 202211671016.6, filed on Dec. 26, 2022. Patent Cooperation Treaty application serial no. PCT/CN2023/077313 and Chinese patent application serial no. 202211671016.6, are incorporated herein in their entireties.

TECHNICAL FIELD

The present application relates to the technical field of computer technology, and more particularly relates to a method of hierarchical semantic mapping based on deep-learning perception, an apparatus, a server, a storage medium, and a computer program product of hierarchical semantic mapping based on deep-learning perception.

BACKGROUND

Map construction refers to the process of estimating the geometric model of the physical world by analyzing the environmental sensing information captured by a handheld or a mobile device-mounted sensor, and thus the physical world is digitalized and may be stored, searched and utilized. Map construction technology can not only be employed for the extraction of geometric parameters and textural features of the physical world, but is also a prerequisite of multiple applications including localization, obstacle representation, collision-free planning, environmental interaction and so forth.

At present, a lot of map construction methods have been proposed and utilized in indoor or outdoor scenarios, by which the 3D reconstruction of an on-site environment is accomplished by leveraging 3D point clouds captured by LiDAR or images captured by cameras.

Nevertheless, current map construction scheme is susceptible to interferences of external factors such as changes in illumination or viewpoint, degradation of structural information and the like, which affect accuracy and robustness of map construction, and as a result limits application of the map for higher-level tasks such as semantic navigation, environment portrayal, intelligent operations and so forth.

SUMMARY

According to various embodiments of the present disclosure, a method of hierarchical semantic mapping based on deep-learning perception, an apparatus, a server, a storage medium, and a computer program product of hierarchical semantic mapping based on deep-learning perception are provided to resolve at least a problem of low accuracy when constructing 3D map in related technology. Technical solution of the present disclosure is as follows.

A method of hierarchical semantic mapping based on deep-learning perception, including:

Obtaining 3D point cloud data of a current scene and an image of the current scene which are captured by a multi-sensor system, and motion state data of the multi-sensor system during capturing.

Projecting the 3D point cloud data onto a corresponding image plane to obtain a depth image for the current scene; wherein the depth image includes multiple semantic regions, different semantic regions represent different object images, and 3D point cloud data projected in each of the semantic regions is semantically associated with corresponding pixels in the scene image.

Performing a point cloud registration process and a pose prediction process on semantically associated 3D point cloud data and the motion state data to obtain an odometer pose related to the multi-sensor system.

Generating a point cloud map for the depth image based on semantically associated 3D point cloud data and the odometer pose of the multi-sensor system, and performing, based on the depth image and the odometer pose of the multi-sensor system, an external ellipse fitting process on each semantic region in the depth image to obtain an object-enveloped map for respective object images.

Performing a coordinate alignment of the point cloud map and the object-enveloped map according to a configuration of coordinate system extrinsic parameters of the multi-sensor system, and fusing the coordinately aligned point cloud map and object-enveloped map into a semantic map.

In accordance with an embodiment, projecting the 3D point cloud data onto a corresponding image plane to obtain a depth image for the current scene includes:

Performing semantic segmentation on the scene image to determine multiple segmented regions.

Inversely projecting respective point cloud points that correspond to 3D point cloud data onto a corresponding image plane where the multiple segmented regions are located, semantically associating respective projected point cloud points with pixels on the corresponding image plane, and generating the depth image.

In accordance with an embodiment, the types of sensors include a multi-line LiDAR and an inertial measurement unit; the 3D data is captured by the multi-line LiDAR, and the 3D point cloud data after semantic association comprises multiple point cloud frames corresponding to multiple consecutive depth image frames; the motion state data includes orientation information and position information captured by the inertial measurement unit during a preset time domain.

Performing a point cloud registration process and a pose prediction process on semantically associated 3D point cloud data and the motion state data to obtain an odometer pose related to the multi-sensor system includes:

Performing feature extraction of semantically associated 3D point cloud data to obtain edge feature points and plane feature points projected from multiple point cloud frames onto corresponding depth image frames.

Determining an incremental odometer pose of the inertial measurement unit according to the orientation information and the position information captured by the inertial measurement unit.

Performing a point cloud registration process on respective edge feature points correspondingly projected from the multiple cloud point frames and respective plane feature points correspondingly projected from the multiple cloud point frames to obtain a laser odometer pose related to the multi-line LiDAR.

Obtaining the odometer pose related to the multi-sensor system by performing pose prediction processing on the incremental odometer pose and the laser odometer pose respectively.

In accordance with an embodiment, performing feature extraction of semantically associated 3D point cloud data to obtain edge feature points and plane feature points projected from multiple point cloud frames onto corresponding depth image frames includes:

Determining a curvature of each point cloud curve corresponding to the semantically associated 3D point cloud data; each point cloud curve is composed by multiple point cloud points.

Performing a consistency check on each point cloud curve, and determining a beam distance between a point cloud point and a neighboring point cloud point of the point cloud point on each point cloud curve.

Performing feature extraction on a first point cloud point having a light beam distance smaller than a preset distance, and determining a feature point type of the first point cloud point after projection; types of the feature points comprise edge feature points and plane feature points.

In accordance with an embodiment, performing a point cloud registration process on respective edge feature points correspondingly projected from the multiple cloud point frames and respective plane feature points correspondingly projected from the multiple cloud point frames to obtain a laser odometer pose related to the multi-line LiDAR includes:

Performing feature matching for respective edge feature points in the multiple point cloud frames according to nearest neighbor rule, to obtain a first nearest point of a previous point cloud frame corresponding to an edge feature point in each point cloud frame, and a second nearest point located on a neighboring line beam to a line beam where the first nearest point is located, and performing feature matching for respective plane feature points in multiple point cloud frames according to nearest neighbor rule, to obtain a third nearest point of a previous point cloud frame corresponding to a plane feature point in each point cloud frame, and a fourth nearest point located on the same line beam as the third nearest point.

Performing semantic consistency checks respectively on each edge feature point with the corresponding first nearest point, and on each edge feature point with the corresponding second nearest point to determine a first class of feature points having consistent semantic information with the corresponding first nearest point and the corresponding second nearest point, and performing semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point.

Determining a first distance between each of the first class of feature points and a line segment formed by the corresponding first nearest point and the corresponding second nearest point, and determining a second distance between each of the second class of feature points and a plane formed between the corresponding third nearest point and the corresponding fourth nearest point.

Obtaining a laser odometer pose of the multi-line LiDAR according to an optimal solution of a target function corresponding to the first distance and the second distance.

Performing, based on the depth image and the odometer pose of the multi-sensor system, an external ellipse fitting process on each semantic region in the depth image to obtain an object-enveloped map for respective object images includes:

Based on an image coordinate system of the each depth image frame, performing an external ellipse fitting process on the each semantic region in the each depth image frame to obtain a dual vector of an external ellipse of the each semantic region and semantic information.

Based on the odometer pose of multi-sensor system, as well as the dual vector and semantic information corresponding to the each semantic region, determining a projection matrix of the same external ellipse fitted among the respective depth image frames, and determining an object-enveloped map for the object images based on the projection matrix.

In accordance with an embodiment, based on the odometer pose of multi-sensor system, as well as the dual vector and semantic information corresponding to the each semantic region, determining a projection matrix of the same external ellipse fitted among the respective depth image frames, and determining an object-enveloped map for the object images based on the projection matrix includes:

Determining an overlapping inlier of the same external ellipse fitted among the respective depth image frames according to odometer poses of the multi-sensor system; overlapping inliers are pixels with the same semantic information across depth image frames.

According to overlapping inliers of the depth image frames and dual vectors of the corresponding external ellipses, determining a projection matrix of the same external ellipse fitted among the depth image frames.

An apparatus of hierarchical semantic mapping based on deep-learning perception, includes:

A data acquisition unit, which is configured to obtain 3D point cloud data of a current scene and a scene image of the current scene which are captured by multi-sensor system, and motion state data of the multi-sensor system during capturing.

A point cloud projection unit, which is configured to: project the 3D point cloud data onto a corresponding image plane to obtain a depth image for the current scene; wherein the depth image includes multiple semantic regions, different semantic regions represent different object images, and 3D point cloud data projected in each of the semantic regions is semantically associated with corresponding pixels in the scene image.

A pose estimation unit, which is configured to perform a point cloud registration process and a pose prediction process on semantically associated 3D point cloud data and the motion state data to obtain an odometer pose related to the multi-sensor system.

A map construction unit, which is configured to: generate a point cloud map for the depth image based on semantically associated 3D point cloud data and the odometer pose of the multi-sensor system, and perform, based on the depth image and the odometer pose of the multi-sensor system, an external ellipse fitting process on each semantic region in the depth image to obtain an object-enveloped map for respective object images.

A map fusion unit, which is configured to: perform a coordinate alignment of the point cloud map and the object-enveloped map according to a configuration of coordinate system extrinsic parameters of the multi-sensor system, and fuse the coordinately aligned point cloud map and the object-enveloped map into a semantic map.

In accordance with an embodiment, the point cloud projection unit further includes:

A region segmentation unit, which is configured to perform semantic segmentation on the scene image to determine multiple segmented regions.

An image generation unit, which is configured to: inversely project respective point cloud points that correspond to 3D point cloud data onto a corresponding image plane where the multiple segmented regions are located, semantically associate respective projected point cloud points with pixels on the corresponding image plane, and generating the depth image.

In accordance with an embodiment, the multi-sensor system include a multi-line LiDAR and an inertial measurement unit; the 3D data is captured by the multi-line LiDAR, and the 3D point cloud data after semantic association includes multiple point cloud frames corresponding to multiple consecutive depth image frames; the motion state data includes orientation information and position information captured by the inertial measurement unit during a preset time domain; the pose estimation unit further includes:

A feature extraction unit, which is configured to perform feature extraction of semantically associated 3D point cloud data to obtain edge feature points and plane feature points projected from multiple point cloud frames onto corresponding depth image frames.

A first odometer unit, which is configured to determine an incremental odometer pose of the inertial measurement unit according to the orientation information and the position information captured by the inertial measurement unit.

A second odometer unit, which is configured to perform a point cloud registration process on respective edge feature points correspondingly projected from the multiple cloud point frames and respective plane feature points correspondingly projected from the multiple cloud point frames to obtain a laser odometer pose related to the multi-line LiDAR.

A third odometer unit, which is configured to obtain the odometer pose of the multi-sensor system by performing pose prediction processing on the incremental odometer pose and laser odometer pose respectively.

In accordance with an embodiment, the feature extraction unit further includes:

A curvature checking unit, which is configured to determine a curvature of each point cloud curve corresponding to the semantically associated 3D point cloud data, wherein each point cloud curve is composed by multiple point cloud points.

A first distance checking unit, which is configured to: perform a consistency check on each point cloud curve, and determine a beam distance between a point cloud point and a neighboring point cloud point of the point cloud point on each point cloud curve.

A feature point extraction unit, which is configured to: perform feature extraction on a first point cloud point having a light beam distance smaller than a preset distance, and determine a feature point type of the first point cloud point after projection, wherein types of the feature points include edge feature points and plane feature points.

In accordance with an embodiment, the second odometer unit further includes:

A nearest point checking unit, which is configured to: perform feature matching for respective edge feature points in the multiple point cloud frames according to nearest neighbor rule, to obtain a first nearest point of a previous point cloud frame corresponding to an edge feature point in each point cloud frame, and a second nearest point located on a neighboring line beam to a line beam where the first nearest point is located, and perform feature matching for respective plane feature points in multiple point cloud frames according to nearest neighbor rule, to obtain a third nearest point of a previous point cloud frame corresponding to a plane feature point in each point cloud frame, and a fourth nearest point located on the same line beam as the third nearest point.

A feature point checking unit, which is configured to: perform semantic consistency checks respectively on each edge feature point with the corresponding first nearest point, and on each edge feature point with the corresponding second nearest point to determine a first class of feature points having consistent semantic information with the corresponding first nearest point and the corresponding second nearest point, and perform semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point.

A second distance checking unit, which is configured to: determine a first distance between each of the first class of feature points and a line segment formed by the corresponding first nearest point and the corresponding second nearest point, and determine a second distance between each of the second class of feature points and a plane formed between the corresponding third nearest point and the corresponding fourth nearest point.

An odometer checking unit, which is configured to obtain a laser odometer pose of the multi-line LiDAR according to an optimal solution of a target function corresponding to the first distance and the second distance.

In accordance with an embodiment, the apparatus further includes:

A fitting processing unit, which is configured to perform an external ellipse fitting process on the each semantic region in the each depth based on an image coordinate system of the each depth image frame to obtain a dual vector of an external ellipse of the each semantic region and semantic information.

A projection unit, which is configured to: determine a projection matrix of the same external ellipse fitted among respective depth image frames based on the odometer pose of the multi-sensor system, as well as the dual vector and semantic information corresponding to each semantic region, and determine the object-enveloped map for object images based on the projection matrix.

A server which includes:

a processor;

a memory, which stores an executable instruction of the processor;

where, the processor is configured to execute the executable instruction for performing the method of hierarchical semantic mapping based on deep-learning perception according to the above-mentioned descriptions.

A computer readable storage medium, including a computer program which is executed by the processor of the server for performing the method of hierarchical semantic mapping based on deep-learning perception according to the above-mentioned descriptions.

A computer program product, including program instructions which are executed by the processor of the server for performing the method of hierarchical semantic mapping based on deep-learning perception.

Details of one or more embodiments of the present disclosure are described in accordance with the following accompanying drawings and descriptions. Other features, objectives and advantages of the present disclosure become obvious with references to the specifications, accompanying drawings and claims.

BRIEF DESCRIPTION OF THE DRAWINGS

To better describe and illustrate those embodiments and/or examples of the present disclosure, references may be made to one or more accompanying drawings. Additional details or examples used to describe the accompanying drawings should not be construed as limiting the scope of any of the present disclosure, presently described embodiments and/or examples, and presently understood best mode of the present disclosure.

FIG. 7 is a flow chart of steps to determine an object envelop map according to an embodiment;

FIG. 8 is a flow chart of steps to determine a projection matrix of an external ellipse according to an embodiment;

DETAILED DESCRIPTION OF THE EMBODIMENTS

In order to make the objectives, technical solutions and advantages of the present disclosure clearer, the present disclosure is described in further detail below with reference to the accompanying drawings and embodiments. It should be understood that particular embodiments described herein are intended only to interpret the present disclosure and not intended to limit the present disclosure.

The term “and/or” in the embodiments of this application refers to any or all possible combinations including one or more associated items listed. It should be further noted that, when used in this specification, “and/or” indicates the presence of the stated feature, integer, step, operation, element and/or component, but does not exclude the presence or inclusion of one or more additional features, integers, steps, operations, elements and/or components, and/or groups thereof.

Terms of “first”, “second”, and the like are used to distinguish different objects, yet not used to describe a particular sequence. In addition, terms of “include”, “have”, and other forms thereof indicates a non-exclusive inclusion. For example, a process, a method, a system, a product, or a device that includes a series of operations or units is not limited to include only the listed operations or units, yet unlisted operations or units may be optionally included. Other operations or units inherent to these processes, methods, products or devices may further be optionally included.

In addition, although terms such as “first” and “second” are used to describe various operations (or various components, various applications, various commands, various data) in the present disclosure, these operations (or components, applications, commands, data) should not be limited by these terms. These terms are only used to differentiate one operation (or one component, one application, one command, one piece of data) from another (or another component, another application, another command, another piece of data). For example, a first closest point cloud may be referred as a second closest point cloud, and a second closest point cloud may also be referred as a first closest point cloud. The two only differ at scopes of what they include, yet without departing from the scope of the present disclosure. The first closest point cloud and the second closest point cloud are both collections of matched point clouds obtained from matching the features of feature points in each point cloud frame. The first closest point cloud and the second closest point cloud only differ in that they are not the same collections of matched point clouds.

Figure 1:
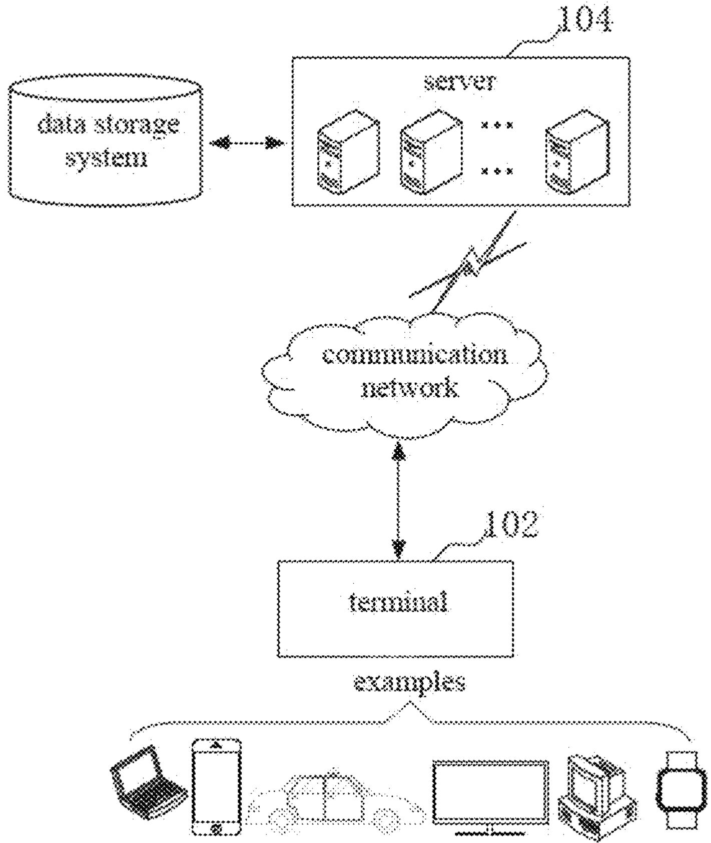
FIG. 1 illustrates an environment to which a method of hierarchical semantic mapping based on deep-learning perception is applied according to an embodiment.

A method of hierarchical semantic mapping based on deep-learning perception provided by embodiments of the present disclosure may be applied to an application environment as shown in FIG. 1, where a terminal 102 communicates with a server 104 via a communication network. A data storage system may store data to be processed by the server 104. The data storage system may be integrated on the server 104, or be placed on a cloud or other network servers.

In accordance with some embodiments, as referring to FIG. 1, the server 104 first obtains 3D point cloud data of a current scene and a scene image of the current scene captured by multi-sensor system, and motion state data of the multi-sensor system during capturing. Then, the server projects 3D point cloud data onto a corresponding image plane, to obtain a depth image for the current scene. The depth image includes multiple semantic regions, where different semantic regions represent different object images, and 3D point cloud data projected in each of the semantic regions is semantically associated with corresponding pixels in the scene image. A point cloud registration process and a pose prediction process are further performed on semantically associated 3D point cloud data and the motion state data to obtain an odometer pose related to the multi-sensor system. A point cloud map for the depth image is generated further based on semantically associated 3D point cloud data and the odometer pose of multi-sensor system; in addition, based on the depth image and the odometer pose of multi-sensor system, an external ellipse fitting process is performed on each semantic region in the depth image to obtain an object-enveloped map for respective object images. Lastly, further according to a configuration of coordinate system extrinsic parameters of multi-sensor system, the server performs a coordinate alignment of the point cloud map and the object-enveloped map, and fuses the coordinately aligned point cloud map and object-enveloped map into a semantic map.

In accordance with some embodiments, terminal 102 (such as a mobile terminal, or a fixed terminal) may be implemented in various forms. Terminal 102 may be a mobile terminal, which may fuse a point cloud map and an object envelop map into a semantic map after aligning the coordinates of the point cloud map and the object envelop map, including mobile phone, smartphone, laptop, portable handheld device, Personal Digital Assistant (PDA), PAD and the like. Terminal 102 may alternatively be a fixed terminal, which may fuse a point cloud map and an object envelop map into a semantic map after aligning the coordinates of the point cloud map and the object envelop map, including Automated Teller Machine (ATM), automatic all-in-one machine, digital TV, desktop PC, fixed computer, and the like.

Assuming terminal 102 is a fixed terminal below. Nevertheless, it should be understood by those skilled in the arts that if there exist operations or elements particularly used for moving purposes, a structure according to the embodiments of the present disclosure may also be applied to a mobile-type terminal 102.

In accordance with some embodiments, a data processing component run by server 104 may load any one of a variety of add-on server applications and/or middleware applications currently executed, including Hyper Text Transfer Protocol(HTTP), File Transfer Protocol(FTP), Common Gateway Interface(CGI), Relational Database Management System(RDBMS) and the like.

In accordance with some embodiments, the server 104 may be achieved using an independent server or a server cluster composed of multiple servers. Server 104 may be adapted to run and provide one or more application services or software components for the terminal 102 described in the present disclosure hereinbefore.

In accordance with some embodiments, the one or more application services or software components provided by the server 104 include a portal port at front end that offers a one-to-one application service to users, and multiple business systems for data processing at back end. This extends a function, which fuses a point cloud map and an object envelop map into a semantic map, to device side or client side such that users can perform works of hierarchical semantic mapping based on deep-learning perception at any time and any places.

In accordance with some embodiments, a function of constructing a semantic map at the device side or the client side may be a computer program that is run in a user mode to complete a certain work or multiple specified works, where the computer program can interact with users and has a visual user interface. The device side or the client side may include two parts: a Graphical User Interface (GUI) and an engine, which may be used to offer users, in the form of a user interface, a digital client system for multi-type application services.

In accordance with some embodiments, a user may input corresponding code data or a corresponding control parameter to the device side or the client side via an input device of terminal 102, to execute an application service of a computer program in server 104, and to display application services in the user interface.

In accordance with some embodiments, an operating system run at the device side or the client side may include a variety versions of Microsoft Windows®, Apple Macintosh and/or Linux operating systems, a variety versions of commercial UNIX® operating systems, UNIX®-like operating systems (including but not limited to a variety of GNU/Linux operating systems, Google Chrome® OS and the like) and/or mobile operating systems (such as iOS®, Windows® Phone, Android® OS, BlackBerry® OS, Palm® OS), along with other online operating systems or offline operating systems. Type of the operating system may be used is not specifically limited here.

Figure 2:
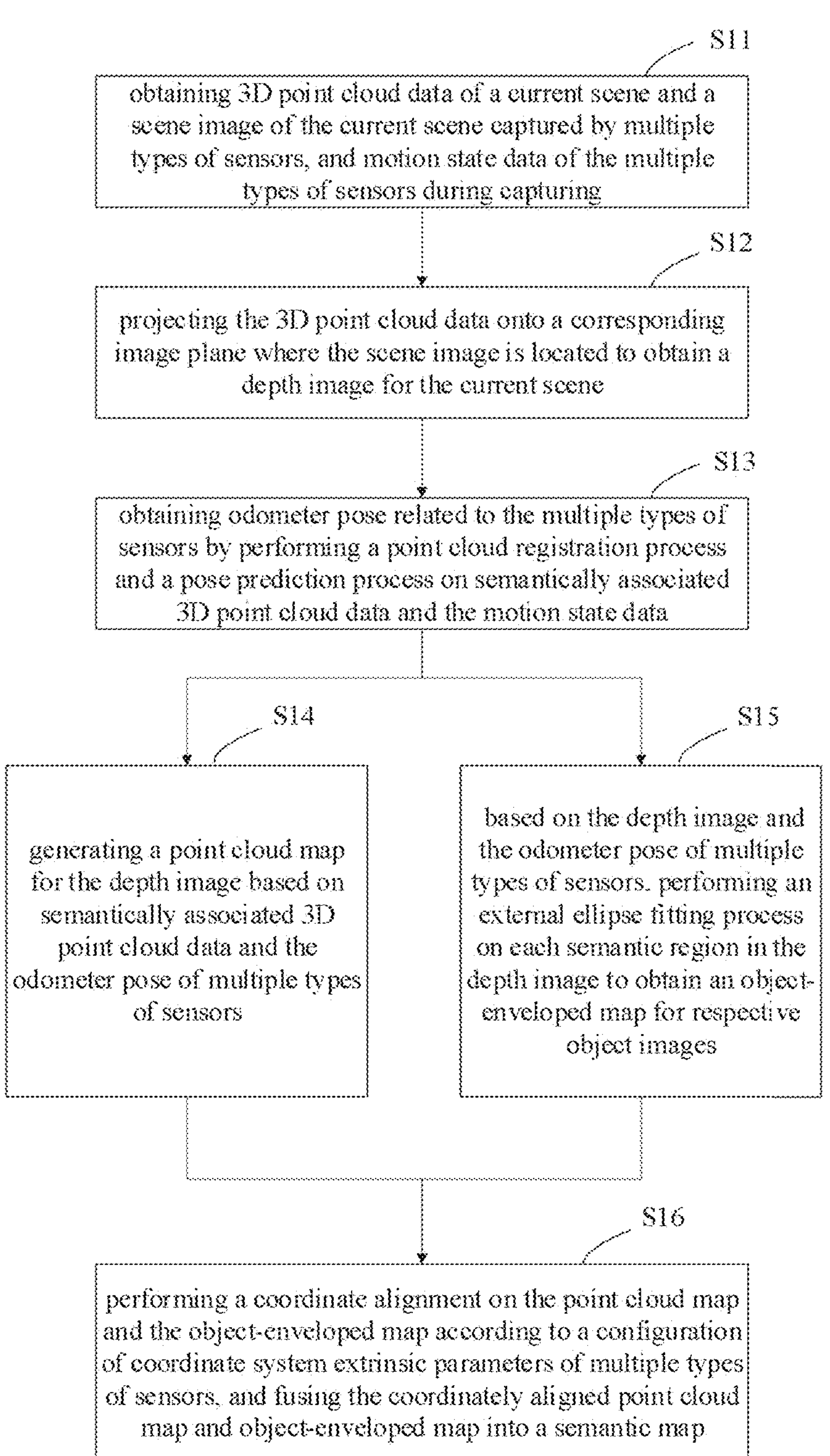
FIG. 2 is a flow chart of a method of hierarchical semantic mapping based on deep-learning perception according to an embodiment.

In accordance with some embodiments, as shown in FIG. 2, a method of hierarchical semantic mapping based on deep-learning perception is provided. The method is applied to a server 104 shown in FIG. 1 as an example to illustrate. The method includes the following steps.

Step S11 includes: obtaining 3D point cloud data of a current scene and a scene image of the current scene which are captured by multi-sensor system, and motion state data of the multi-sensor system during capturing.

In accordance with some embodiments, the multi-sensor system includes a multi-line LiDAR, an inertial measurement unit (IMU) and a monocular camera.

In accordance with some embodiments, a multi-line LiDAR in the server emits a laser beam signal to a target object in a current scene in real-time, performs processing and comparison on a reflected signal received from the target object and the laser beam signal to obtain distance information between a current sensor and the target object.

In accordance with some embodiments, the multi-line LiDAR in the server emits multiple beams of rotatory laser lines to a target object in a current scene in real-time, and eventually receives discrete 3D point cloud data as feedback, where the 3D point cloud data reflects geometric information of the current scene.

In accordance with some embodiments, the monocular camera in the server is used to capture a scene image of a current scene. The scene image includes light intensity of environment, geometric shapes of environment, and surface material and texture information, which are captured as integrated data.

In accordance with some embodiments, motion state data includes orientation information and position information captured by an IMU during a preset time domain.

Orientation information includes a rotational angular velocity and a linear acceleration of the multi-sensor system itself.

As an example, a map construction device in the server uses a mounted multi-line LiDAR to continuously scan 3D point cloud data in a current environment from moment i to moment j. In addition, the map construction device uses a mounted IMU to continuously capture a rotational angular velocity and a linear acceleration of the map construction device itself from moment i to moment j.

In accordance with some embodiments, before the multiple-types of sensors in the map construction device operate, the map construction device first calibrates internal parameters such as focal length and distortion parameter of a camera sensor (e.g., a monocular camera). The map construction device also calibrates white noise and offset of an IMU. Using a calibration plate as an intermediate medium, the map construction device calibrates external parameters of a multi-sensor coordinate system among the IMU, the camera and the LiDAR.

In accordance with some embodiments, the map construction device may perform preprocessing on a scene image and 3D point cloud data captured by the camera sensor. The preprocessing includes a distortion correction process on 3D point cloud data in a single captured point cloud frame, distortion removal on the scene image, cropping of the scene image, and the like.

In accordance with some embodiments, the map construction device is also able to perform a coordinate system transformation on 3D point cloud data captured by the multi-line LiDAR, perform posture reference coordinate system transformation and unification among a variety of sensors, and perform a temporal alignment of respective pieces of sensing data based on different sensing frequencies.

Step S12 includes projecting the 3D point cloud data onto a corresponding image plane to obtain a depth image for the current scene.

In accordance with some embodiments, the server first inputs a preprocessed (including preprocessings such as distortion removal and cropping) scene image into a pre-set neural network to perform semantic segmentation such that the scene image is segmented into multiple semantic regions. Then, the server further uses a pre-set camera imaging model to inversely project 3D point cloud data according to a corresponding projection depth onto a corresponding image plane where respective semantic regions are located, in order to generate a depth image in a corresponding camera coordinate system, and to semantically associate point cloud points in the 3D point cloud data with pixels in the scene image.

In accordance with some embodiments, the depth image includes multiple semantic regions, where different semantic regions represent different object images, and 3D point cloud data projected in each of the semantic regions is semantically associated with corresponding pixels in the scene image.

Semantic association is used to indicate that, both 3D point cloud data projected in respective semantic regions and corresponding pixels in the scene image are tagged with semantic tags that correspond to object images, and projected 3D point cloud data and pixels which form a matching pair are tagged with an identical semantic tag.

In accordance with some embodiments, the 3D point cloud data after being semantically associated includes multiple point cloud frames corresponding to multiple consecutive depth image frames.

As an example, when the multi-sensor system mounted on the map construction device is in motion, the server captures, from the current scene, 3D point cloud data and multiple scene images from moment i to moment j, classifies the 3D data in the above-mentioned time range into multiple point cloud frames according to a pre-set frame extraction rate, respectively projects the multiple point cloud frames onto corresponding image planes where the multiple scene images are located, to obtain multiple depth images for the current scene from moment i to moment j.

Step S13 includes performing a point cloud registration process and a pose prediction process on semantically associated 3D point cloud data and the motion state data to obtain an odometer pose related to multi-sensor system.

In an embodiment, the server first performs calculation of integrals, according to a pre-set sensing frequency of the IMU, over motion status data captured by the IMU, and obtains a quantity of state related to sensing corresponding to the motion status data. Then, the server calculates, based on a length of time in which the IMU captures the motion status data and a pre-set vector of gravitational direction, incremental odometer related to the IMU. In addition, the server sequentially performs curvature calculation, outlier elimination, edge feature extraction and plane feature extraction on semantically associated 3D point cloud data in order to obtain 3D point cloud data with feature labels. Then, the server performs point cloud registration for consecutive frames and inter-frame pose transformation for consecutive frames on 3D point cloud data with feature labels (i.e., multiple point cloud frames with feature labels) in order to obtain laser odometer related to the LiDAR. Lastly, the server adopts a pre-set factor graph framework to fuse data of two sensor odometers of different frequencies and different types (i.e., the incremental odometer of the IMU and the laser odometer), in order to obtain a predicted odometer pose related to the multi-sensor system in a sliding time window.

Step S14 includes generating a point cloud map for the depth image based on semantically associated 3D point cloud data and the odometer pose of the multi-sensor system.

In an embodiment, the server first determines, among semantically associated 3D point cloud data, multiple point cloud frames that temporally correspond to multiple consecutive depth image frames. Then, the server further determines a target odometer pose of the multi-sensor system temporally corresponding to each point cloud frame. For every point cloud frame, the server splices the target odometer pose with each point cloud point in the point cloud frame to obtain a point cloud map.

Illustratively, the server may first perform feature point extraction on target point clouds of each point cloud frame to obtain target feature points corresponding to respective target point clouds, where target feature points may include edge points, plane points and the like. Moreover, a target odometer pose at a target moment corresponding to each point cloud frame may be determined based on the target feature points. A way to determine the target odometer pose may be as follows. Based on different capturing moments (including moments from starting moment i to terminating moment j), different weight values are assigned to respective classes of target feature points. Furthermore, inter-frame matching is performed based on corresponding target feature points between every two adjacent point cloud frames and weight values corresponding to these target feature points, to obtain a pose change amount between odometer poses of the multi-sensor system corresponding to the every two cloud frames at a same moment; and then a target odometer pose corresponding to each point cloud frame is determined based on the pose change amount.

Furthermore, as there inevitably exist accumulating errors in the target odometer pose, a pre-set optimized algorithm may be used by the server to optimize the target odometer pose, and to obtain an optimized odometer pose for each point cloud frame after a target odometer pose for every point cloud frame is determined by the server. For example, an optimization problem may be constructed based on historical point cloud frames, and pose optimization of target odometry pose corresponding to each point cloud frame may be performed using a nonlinear optimization method to obtain an optimized odometry pose corresponding to each point cloud frame.

Lastly, a SLAM algorithm may be used by the server to splice a target odometer pose corresponding to each point cloud frame and respective point cloud points corresponding to the each point cloud frame to generate a point cloud map.

In step S15, based on the depth image and the odometer pose of the multi-sensor system, an external ellipse fitting process is performed on each semantic region in the depth image to obtain an object-enveloped map for respective object images.

In an embodiment, the server first performs ellipse fitting on each semantic region in each depth image frame to obtain a regular rectangular envelop box of each semantic region in different depth image frames, and then the server fits an inscribed rectangle of each rectangular box. Among depth image frames, the server calculates projected overlapping point cloud points in associated inscribed ellipses, and according to the projected overlapping point cloud points among inscribed ellipses, the server determines a projection function for an object represented by inscribed ellipses. An object envelop map for respective object images is also obtained according to projection functions for objects.

As an example, depth image frame A, depth image frame B and depth image C respectively include three classes of corresponding semantic regions, where a first class of semantic region represents object S1, a second class of semantic region represents object S2 and a third class of semantic region represents object S3. The server performs ellipse fitting on respective semantic regions to obtain regular rectangular envelop boxes for the respective semantic regions, and then performs inscribed ellipse fitting on the regular rectangular envelop boxes for the respective semantic regions to obtain ellipse A1, ellipse A2, ellipse A3 corresponding to depth image frame A, ellipse B1, ellipse B2, ellipse B3 corresponding to depth image frame B, ellipse C1, ellipse C2, ellipse C3 corresponding to depth image frame C. Among them, ellipse A1, ellipse B1 and ellipse C1 are inscribed ellipses correspondingly fitted for object S1, ellipse A2, ellipse B2 and ellipse C2 are inscribed ellipses correspondingly fitted for object S2, ellipse A3, ellipse B3 and ellipse C3 are inscribed ellipses correspondingly fitted for object S3. Then, the server further determines a point cloud point set P1 corresponding to an overlapped projection among ellipse A1, ellipse B1 and ellipse C1, a point cloud point set P2 corresponding to an overlapped projection among ellipse A2, ellipse B2 and ellipse C2, and a point cloud point set P3 corresponding to an overlapped projection among ellipse A3, ellipse B3 and ellipse C3. Then, the server determines a projection function corresponding to object S1 based on the point cloud point set P1, determines a projection function corresponding to object S2 based on the point cloud point set P2, and determines a projection function corresponding to object S3 based on the point cloud point set P3. Lastly, the server fuses the projection function of object S1, the projection function of object S2 and the projection function of object S3 to obtain an object-enveloped map for respective depth image frames.

In step S16, according to a configuration of coordinate system extrinsic parameters of the multi-sensor system, a coordinate alignment is performed on the point cloud map and the object-enveloped map, and the coordinately aligned point cloud map and object-enveloped map are fused into a semantic map.

In an embodiment, the server fuses coordinately aligned point cloud maps and maps of object envelops frame by frame according to a corresponding temporal sequence to obtain multiple consecutive single-frame maps, and eventually splices the multiple consecutive single-frame maps according to the temporal sequence to form a semantic map.

During the above-mentioned process of hierarchical semantic mapping based on deep-learning perception, the server first obtains 3D point cloud data of a current scene and scene images of the current scene captured by multi-sensor system, and motion state data of the multi-sensor system during capturing. Then, the server projects 3D point cloud data onto a corresponding image plane, to obtain a depth image for the current scene. The depth image includes multiple semantic regions, where different semantic regions represent different object images, and 3D point cloud data projected in each of the semantic regions are semantically associated with corresponding pixels in the scene image. A point cloud registration process and a pose prediction process are further performed on semantically associated 3D point cloud data and the motion state data to obtain a odometer pose related to the multi-sensor system. A point cloud map for the depth image is generated further based on semantically associated 3D point cloud data and the odometer pose of multi-sensor system; in addition, based on the depth image and the odometer pose of multi-sensor system, an external ellipse fitting process is performed on each semantic region in the depth image to obtain an object-enveloped map for respective object images. Lastly, further according to a configuration of coordinate system extrinsic parameters of multi-sensor system, the server performs a coordinate alignment of the point cloud map and the object-enveloped map, and fuses the coordinately aligned point cloud map and object-enveloped map into a semantic map. In this way, on the one hand, projecting the 3D point cloud data onto a corresponding image plane, and semantically associating 3D point cloud data with pixels of the scene image in order to obtain a depth image used for map generation at a later stage, allows pixels in the depth image to be reliable at semantically associating with point cloud points in the depth image, which further enables the point cloud map and the object-enveloped map generated at a subsequent stage to be more recognizable and robust. On the other hand, the semantic map may be able to represent more information of a scene when it is eventually fused by the object-enveloped map for respective object images and a point cloud map for the depth image, such that an application of the semantic map is broadened for higher-level tasks, including tasks of semantic navigation, environment portrayal, intelligent operation, and the like.

It may be understood by those skilled in the art that, in an above-mentioned method presented by the detailed description, the method disclosed may be implemented through a more detailed way. For example, the above-mentioned description of fusing a coordinately aligned point cloud map and an object envelop map into a semantic map is only illustrative.

Figure 3:
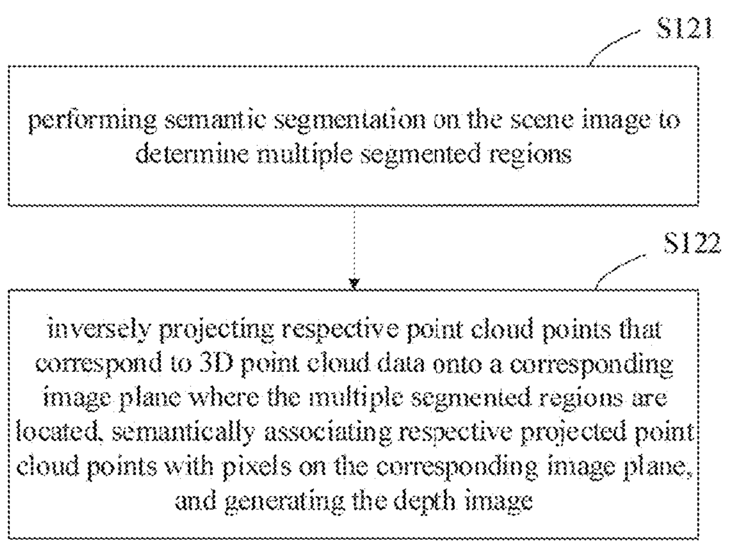
FIG. 3 is a flow chart of a step of generating depth images according to an embodiment.

Reference may be made to FIG. 3, which is a schematic flow chart of depth image generation according to an exemplary embodiment of the present disclosure. In step S12, a process in which the server projects the 3D point cloud data onto a corresponding image plane to obtain a depth image for the current scene, may be specifically implemented in the following manner.

Step S121 includes performing semantic segmentation on the scene image to determine multiple segmented regions.

In accordance with some embodiments, the server transmits a preprocessed scene image (e.g., distortion eliminated and cropped RGB image) to a trained deep neural network (e.g., LSTM, CNN) for semantic segmentation to obtain multiple semantic segmented regions at pixel levels, where in each of the segmented regions, there includes one object or one class of objects.

As an example, for a scene image A in which there display an object P1, an object P2 and an object P3, the scene image A is semantically segmented using the deep neural network to obtain a segmented region A1 including only pixels corresponding to object P1, a segmented region A2 including only pixels corresponding to object P2, and a segmented region A3 including only pixels corresponding to object P3.

Step S122 includes inversely projecting respective point cloud points that correspond to 3D point cloud data onto a corresponding image plane where the multiple segmented regions are located, semantically associating respective projected point cloud points with pixels on the corresponding image plane, and generating the depth image.

In accordance with some embodiments, the server further uses a pre-set camera imaging model to inversely project 3D point cloud data according to a corresponding projection depth onto a corresponding image plane where respective semantic regions are located, in order to generate a depth image under a corresponding camera coordinate system, and the server semantically associates point cloud points in the 3D point cloud data with pixels in the scene image.

In accordance with some embodiments, the depth image includes multiple semantic regions, where different semantic regions represent different object images, and 3D point cloud data projected in each of the semantic regions is semantically associated with corresponding pixels in the scene image.

Semantic association is used to indicate that, both 3D point cloud data projected in respective semantic regions and corresponding pixels in the scene image are tagged with semantic tags corresponding to object images, and projected 3D point cloud data and pixels which form a matching pair are tagged with an identical semantic tag.

Figure 4:
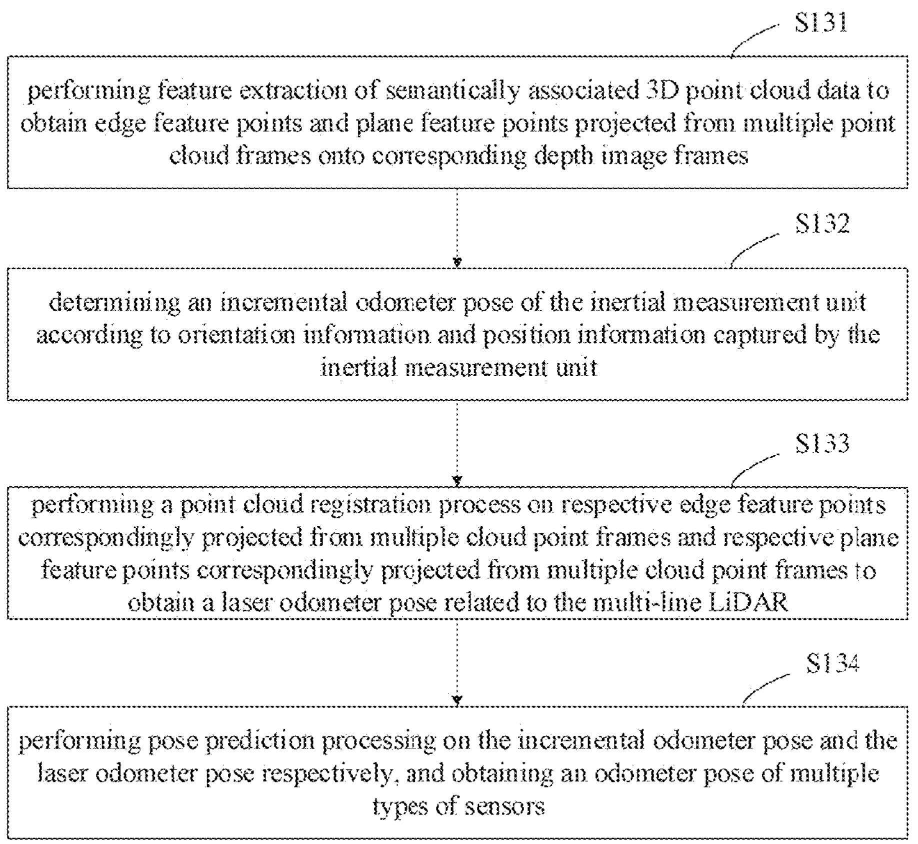
FIG. 4 is a flow chart of steps to determine odometer poses of multi-sensor system according to an embodiment.

Reference may be made to FIG. 4 which is a schematic flow chart of determining an odometer pose of the multi-sensor system according to an exemplary embodiment of the present disclosure. In step S13, the process in which the server performs a point cloud registration process and a pose prediction process on semantically associated 3D point cloud data and the motion state data to obtain an odometer pose related to the multi-sensor system includes the following steps.

Step S131 includes performing feature extraction of semantically associated 3D point cloud data to obtain edge feature points and plane feature points projected from multiple point cloud frames onto corresponding depth image frames.

Figure 5:
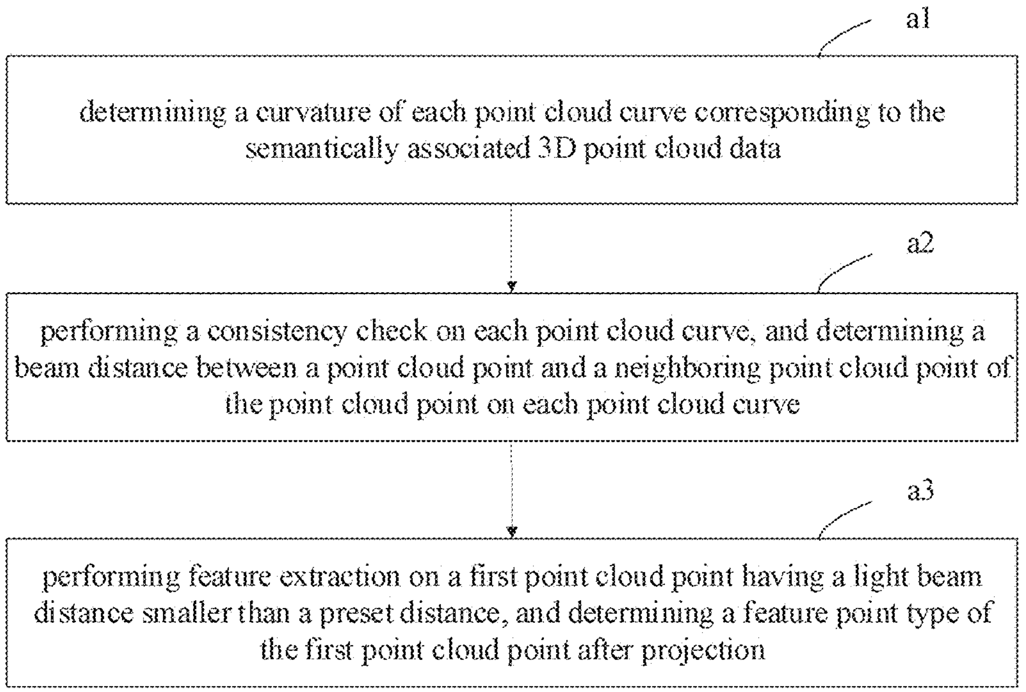
FIG. 5 is a flow chart of steps to extract feature points according to an embodiment.

Reference may be made to FIG. 5, which is a schematic flow chart of feature point extraction provided by an exemplary embodiment of the present disclosure. In the step S131, the process in which the server performs feature extraction of semantically associated 3D point cloud data to obtain edge feature points and plane feature points projected from multiple point cloud frames onto corresponding depth image frames may be specifically implemented in a following manner.

Operation a1 includes determining a curvature of each point cloud curve corresponding to the semantically associated 3D point cloud data.

In accordance with some embodiments, each point cloud curve is composed by multiple point cloud points.

In accordance with some embodiments, the server takes each point cloud point on each point cloud curve as a target point cloud point, determines an average of distances between neighboring point cloud points of a pre-set quantity which are centered around the target point cloud point, and then uses the average of distances as a smoothing index of the point cloud curve and calculates a curvature of each target point cloud.

Operation a2 includes performing a consistency check on each point cloud curve, and determining a beam distance between a point cloud point and a neighboring point cloud point of the point cloud point on each point cloud curve.

In accordance with some embodiments, the server takes each point cloud point on each point cloud curve as a target point cloud point, determines a light beam distance between each target point cloud point and a neighboring point cloud point of the each target point cloud point via a geometric consistency check, and masks a target point cloud point having a light beam distance greater than a pre-set distance.

Operation a3 includes performing feature extraction on a first point cloud point having a light beam distance smaller than a preset distance, and determining a feature point type of the first point cloud point after projection.

In accordance with some embodiments, the server sorts respective point clouds on each point cloud curve according to curvatures of the respective point cloud curves, then performs feature extractions on first point clouds whose light beam distances are smaller than the preset distance, marks multiple first point cloud points, whose curvatures are greater than a preset value, as edge feature points, and marks multiple first point cloud points, whose curvatures are smaller than or equal to the pre-set value, as plane feature points.

Step S132 includes determining an incremental odometer pose of the inertial measurement unit according to orientation information and position information captured by the inertial measurement unit.

In accordance with some embodiments, the server first performs calculation of integrals, according to a sensing frequency of the IMU, on the orientation information and position information captured by the IMU to determine a quantity of state related to sensing of the IMU.

Where, a quantity of state related to sensing of the IMU at moment k is defined by the server as follows.

$$xd_k = [p_k^w, v_k^w, q_k^w, b_k^a, b_k^g], k \in [0, n]$$

Where, a superscript w in the formula indicates that the associated value uses world coordinate system as a reference system;

$$p_k^w \in \mathbb{R}^3$$

refers to a position of the JMU relative to the world coordinate system w at moment k; in a similar manner, $$v_k^w \in \mathbb{R}^3$$

refers to a velocity at moment k;

$$q_k^w \in \mathbb{R}^4$$

refers to a rotation posture represented in quaternion at moment k;

$$b_k^a \in \mathbb{R}^3 \text{ and } b_k^g \in \mathbb{R}^3$$

are respectively an acceleration and a quantity of angular velocity drift of the IMU at moment k.

Further, pre-integrated terms of the IMU from moment i to moment j (including orientation information $$q_j^i,$$

and position information $$\alpha_j^i, \beta_j^i)$$

are calculated by the server as follows.

$$\alpha_j^i = \int\int_{t\in[i,j]} (q_t^i a_t)\delta t^2$$

$$\beta_j^i = \int_{t\in[i,j]} (q_t^i a_t)\delta t$$

$$q_j^i = \int_{t\in[i,j]} q_t^i \otimes \begin{bmatrix} 0 \\ \frac{1}{2}\omega_t \end{bmatrix} \delta t$$

Where, $\alpha_t$ is a measured value of acceleration of the IMU at moment t and $\omega_t$ is a measured value of angular velocity of the IMU at moment t; ⊗ is a multiplication operation in quaternion;

$$q_t^i$$

is a orientation transformation of the IMU at moment t relative to moment i represented in quaternion.

Further, in a case that the quantity of state related to sensing at moment i, $$[p_i^w, v_i^w, q_i^w, b_i^a, b_i^g],$$

is already known by the server, an incremental odometer pose of the inertial measurement unit at moment j is calculated as follows.

$$\begin{bmatrix} p_j^w \\ v_j^w \\ q_j^w \\ b_j^a \\ b_j^g \end{bmatrix} = \begin{bmatrix} p_i^w + v_i^w \Delta t - \frac{1}{2} g^w \Delta t^2 + q_i^w \alpha_j^i \\ v_i^w - g^w \Delta t + q_i^w \beta_j^i \\ q_i^w p_j^i \\ b_i^a \\ b_i^g \end{bmatrix}.$$

Where, $$\alpha_j^i, \beta_j^i, q_j^i$$

are pre-integrated terms calculated from last process, $g^w$ is a vector of gravitational direction, Δt is a time difference between moment i and moment j.

In step S133, a point cloud registration process is performed on respective edge feature points correspondingly projected from multiple cloud point frames and respective plane feature points correspondingly projected from multiple cloud point frames to obtain a laser odometer pose related to a multi-line LiDAR.

In accordance with some embodiments, the server first establishes association between feature points of a current point cloud frame t+1 and feature points of a previous point cloud frame t, performs temporal alignment using an odometer provided by the IMU, and obtains a relative pose transformation $$(R_{t+1}^t, t_{t+1}^t)$$

from point cloud frame t to point cloud frame t+1 with the help of a transformation of extrinsic parameters, in order to transform cloud point coordinates at moment t into a LiDAR coordinate system at moment t+1.

Figure 6:
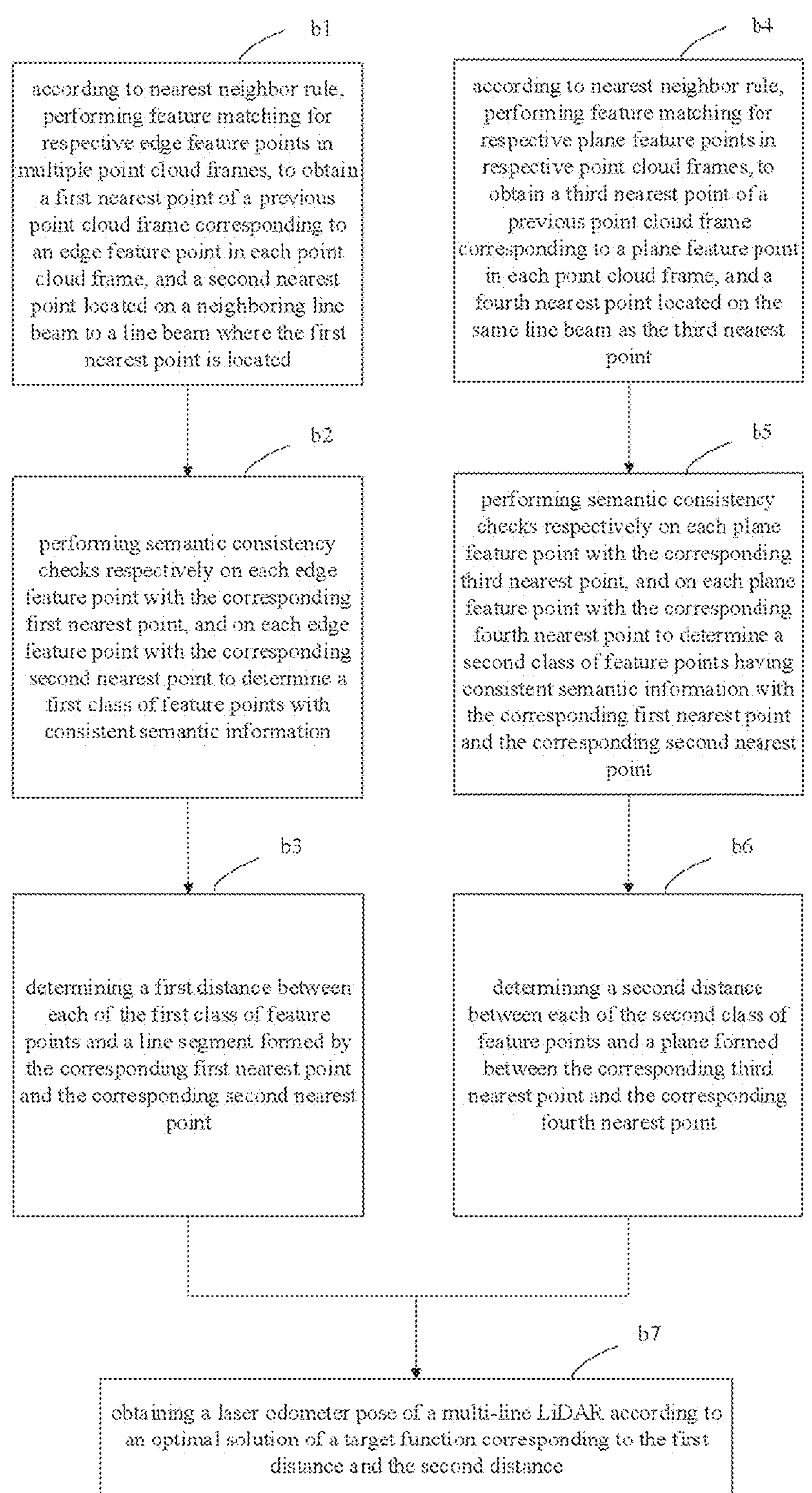
FIG. 6 is a flow chart of steps to determine object envelop maps according to an embodiment.

Reference may be made to FIG. 6, which is a schematic flow chart of determining a laser odometer pose of a multi-line LiDAR according to an exemplary embodiment of the present disclosure. In the step S133, a process in which a cloud registration process is performed by the server on respective edge feature points correspondingly projected from multiple cloud point frames and respective plane feature points correspondingly projected from multiple cloud point frames to obtain a laser odometer pose related to a multi-line LiDAR, may be specifically implemented in a following manner.

Operation b1, according to nearest neighbor rule, performing feature matching for respective edge feature points in multiple point cloud frames, to obtain a first nearest point of a previous point cloud frame corresponding to an edge feature point in each point cloud frame, and a second nearest point located on a neighboring line beam to a line beam where the first nearest point is located.

Operation b2, performing semantic consistency checks respectively on each edge feature point with the corresponding first nearest point, and on each edge feature point with the corresponding second nearest point to determine a first class of feature points having consistent semantic information with the corresponding first nearest point and the corresponding second nearest point.

Operation b3, determining a first distance between each of the first class of feature points and a line segment formed by the corresponding first nearest point and the corresponding second nearest point.

As an example, the server first performs feature matching on a k-th edge feature point $$\mathbb{P}_{t+1,k}^e$$

at moment t+1 according to the nearest neighbor rule, and then finds a first nearest point $$\mathbb{P}_{t,u}^e$$

of the k-th edge feature point at time t, as well as a second nearest point $$\mathbb{P}_{t,v}^e$$

located on a neighboring line beam to a line beam where the first nearest point $$\mathbb{P}_{t,u}^e$$

is located. Then, the server performs semantic consistency checks respectively on the edge feature point $$\mathbb{P}_{t+1,k}^e$$

with the first nearest point $$\mathbb{P}^e_{t,u},$$

and on the edge feature point $$\mathbb{P}^e_{t+1,k}$$

with the second nearest point $$\mathbb{P}^e_{t,v}$$

In the case that $$\mathbb{P}^e_{t+1,k} \text{ and } \mathbb{P}^e_{t,u}$$

correspond to an identical semantic tag, and $$\mathbb{P}^e_{t+1,k} \text{ and } \mathbb{P}^e_{t,v}$$

correspond to an identical semantic tag, the server continues to calculate a cost function among the edge feature point $$\mathbb{P}^e_{t+1,k},$$

the corresponding first nearest point $$\mathbb{P}^e_{t,u},$$

as well as the corresponding second nearest point $$\mathbb{P}^e_{t,v},$$

to obtain a first distance between the edge feature point $$\mathbb{P}^e_{t+1,k}$$

and a line segment formed by the corresponding first nearest point $$\mathbb{P}^e_{t,u}$$

and the corresponding second nearest point $$\mathbb{P}^e_{t,v}.$$

In the case that $$\mathbb{P}^e_{t+1,k} \text{ and } \mathbb{P}^e_{t,u}$$

and do not correspond to an identical semantic tag, or $$\mathbb{P}^e_{t+1,k} \text{ and } \mathbb{P}^e_{t,v}$$

do not correspond to an identical semantic tag, then $$\mathbb{P}^e_{t+1,k}$$

is blocked.

Where, the cost function, which is based on a plane geometry formula to calculate the distance $$d^e_k$$

between the edge feature point $$\mathbb{P}^e_{t+1,k}$$

and a line segment formed by the corresponding first nearest point $$\mathbb{P}^e_{t,u}$$

and the corresponding second nearest point $$\mathbb{P}^e_{t,v},$$

is as follows.

$$d^e_k = \frac{\left|\left(\mathbb{P}^e_{t+1,k} - \mathbb{P}^e_{t,u}\right) \times \left(\mathbb{P}^e_{t+1,k} - \mathbb{P}^e_{t,v}\right)\right|}{\left|\mathbb{P}^e_{t,u} - \mathbb{P}^e_{t,v}\right|}$$

Operation b4, according to nearest neighbor rule, performing feature matching for respective plane feature points in respective point cloud frames, to obtain a third nearest point of a previous point cloud frame corresponding to a plane feature point in each point cloud frame, and a fourth nearest point located on the same line beam as the third nearest point.

Operation b5, performing semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point.

Operation b6, determining a second distance between each of the second class of feature points and a plane formed between the corresponding third nearest point and the corresponding fourth nearest point.

As an example, the server first performs feature matching on a k-th plane feature point $$\mathbb{P}_{t+1,k}^{p}$$

at moment t+1 according to the nearest neighbor rule, and then finds a third nearest point $$\mathbb{P}_{t,u}^{p}$$

of the k-th plane feature point at time t, as well as a fourth nearest point $$\mathbb{P}_{t,v}^{p}$$

located on the same line beam as the third nearest point. Then, the server performs semantic consistency checks respectively on the plane feature point $$\mathbb{P}_{t+1,k}^{p}$$

with the third nearest point $$\mathbb{P}_{t,u}^{p},$$

and on the plane feature point $$\mathbb{P}_{t+1,k}^{e}$$

with the fourth nearest point $$\mathbb{P}_{t,v}^{p}.$$

In the case that $$\mathbb{P}_{t+1,k}^{p} \text{ and } \mathbb{P}_{t,u}^{p}$$

correspond to an identical semantic tag and $$\mathbb{P}_{t+1,k}^{p} \text{ and } \mathbb{P}_{t,v}^{p}$$

correspond to an identical semantic tag, the server continues to calculate a cost function among the plane feature point $$\mathbb{P}_{t+1,k}^{p},$$

the corresponding third nearest point $$\mathbb{P}_{t,u}^{p},$$

as well as the corresponding fourth nearest point $$\mathbb{P}_{t,v}^{p},$$

to obtain a second distance between the plane feature point $$\mathbb{P}_{t+1,k}^{p}$$

and a plane formed between the corresponding third nearest point $$\mathbb{P}_{t,u}^{p}$$

and the corresponding fourth nearest point $$\mathbb{P}_{t,v}^{p}.$$

In the case that the plane feature point $$\mathbb{P}_{t+1,k}^{p}$$

and the third nearest point $$\mathbb{P}_{t,u}^{p}$$

do not correspond to an identical semantic tag, or the plane feature point $$\mathbb{P}_{t+1,k}^{p}$$

and the fourth nearest point $$\mathbb{P}_{t,v}^{p}$$

do not correspond to an identical semantic tag, then $$\mathbb{P}_{t+1,k}^{p}$$

is blocked.

Where, the cost function, which is based on a plane geometry formula to calculate the distance $$d_k^p$$

between the plane feature point $$\mathbb{P}_{t+1,k}^p$$

and the plane which is formed between the corresponding third nearest point $$\mathbb{P}_{t,u}^p$$

and the corresponding fourth nearest point $$\mathbb{P}_{t,v}^p,$$

is as follows.

$$d_k^e = \frac{\left| \begin{array}{c} \left(\mathbb{P}_{t+1,k}^p - \mathbb{P}_{t,u}^p\right) \\ (\mathbb{P}_{t,u}^p - \mathbb{P}_{t,v}^p) \times (\mathbb{P}_{t,u}^p - \mathbb{P}_{t,w}^p) \end{array} \right|}{\left|(\mathbb{P}_{t,u}^p - \mathbb{P}_{t,v}^p) \times \left(\mathbb{P}_{it,u}^p - \mathbb{P}_{t,w}^p\right)\right|}$$

Operation b7, obtaining a laser odometer pose of a multi-line LiDAR according to an optimal solution of a target function corresponding to the first distance and the second distance.

In accordance with some embodiments, the target function corresponding to the first distance and the second distance may be a non-linear least square function between the first distance and the second distance as follows.

$$\min_{R_{k+1}^t, t_{t+1}^t} \left\{ \sum_{\mathbb{P}_k^e \in \{\mathbb{P}^e\}} d_k^e + \sum_{\mathbb{P}_k^e \in \{\mathbb{P}^p\}} d_k^p \right\}$$

In accordance with some embodiments, the server uses Levenberg-Maquardt algorithm to iterate through minimized errors of the target function to obtain an optimal solution of $$R_{t+1}^t \text{ and } t_{t+1}^t,$$

that is, the pose transformation of the LiDAR between two frames, to obtain a laser odometer pose of the multi-line LiDAR.

Step S134 includes performing pose prediction processing on the incremental odometer pose and the laser odometer pose respectively, and obtaining an odometer pose of multi-sensor system.

In accordance with some embodiments, by performing through the above-mentioned operations, the server has already obtained preliminary motion states of two sensors which are the incremental odometer of the IMU and the laser odometer of the LiDAR. In order to further improve the accuracy of state estimation and reduce the impact of accumulated errors, the server adopts a factor graph framework to perform fusion optimization of two sensors with different frequencies and different types. A sliding window data acquisition approach may be used to constrain and optimize a state of pose at a current moment through estimation data of a neighboring frame.

Specifically, the server first performs a factor construction on the incremental odometer poses of the IMU, including aligning data of IMU at moment i with data of the LiDAR at moment t, and aligning data of IMU at moment j with data of the LiDAR at moment t+1. During this time period, state estimation cost of an incremental odometer pose is as follows.

$$r(z_j^i, x_k) = \begin{bmatrix} r_p \\ r_v \\ r_q \\ r_{ba} \\ r_{bg} \end{bmatrix} = \begin{bmatrix} q_i^w\left(p_j^w - p_i^w - v_i^w \Delta t + \frac{1}{2} g^w \Delta t^2\right) - \alpha_j^i \\ q_i^w\left(v_j^w - v_i^w + g^w \Delta t\right) - \beta_j^i \\ 2\left[q_i^j \otimes q_j^w)\right]_{xyz} \\ b_j^\alpha - b_i^a \\ b_j^g - b_i^g \end{bmatrix}$$

Where, $$z_j^i$$

refers to an entirety of measured data, namely a measured acceleration and a measured angular velocity, of the IMU from moment i to moment j. $x_k$, $k \in [i,j]$ refers to an entirety of estimated state of IMU from moment i to moment j.

Further, the server performs a factor reconstruction on the laser odometer of the LiDAR, including defining a residual at moment t+1 as follows.

$$r(\mathbb{P}, x_t) = \sum_{\mathbb{P}_k^e \in \{\mathbb{P}^e\}} d_k^e + \sum_{\mathbb{P}_k^e \in \{\mathbb{P}^p\}} d_k^p$$

Further, the server constructs a joint error formula of the IMU and the LiDAR as follows.

$$\min_{R,t} \left\{ \sum_t \|r(z_{t+1}^t, x_k)\| + \sum_t \|r(\mathbb{P}, x_t)\| \right\}.$$

Lastly, the server uses Levenberg-Maquardt algorithm to iterate through the joint error formula of the IMU and the LiDAR, which may optimize a batch of estimated states in the sliding window, to obtain a batch of optimized odometer poses of the multi-sensor system.

Reference may be made to FIG. 7 which is a flow chart of determining an object-enveloped map according to an exemplary embodiment of the present disclosure. In the step S15, the process in which an external ellipse fitting process is performed on each semantic region in the depth image to obtain an object-enveloped map for respective object images based on the depth image and odometer pose of multi-sensor system, may be specifically implemented in the following manner.

Step S151, based on an image coordinate system of each depth image frame, an external ellipse fitting process is performed on each semantic region in each depth image frame to obtain a dual vector of an external ellipse of each semantic region and semantic information.

In accordance with some embodiments, the server first performs an ellipse fitting process on segmented irregular object images in respective semantic regions. To accelerate this process, the server may obtain a maximum coordinate system and a minimum coordinate system for each object image using an image coordinate system as a reference, then obtain regular rectangular envelop boxes for object images, and fit these rectangular boxes with inscribed ellipses to obtain dual vectors of external ellipses in respective semantic regions and semantic information in object images.

Specifically, the server records coordinate of a left upper corner of a rectangular envelop box as (x1, y1), coordinate of a right lower corner of the rectangular envelop box as (x2, y2), coordinate of a center of the rectangular envelop box as (tx, ty). Parameters of an ellipse inscribed in the rectangular envelop box are the following: a major axis is a=(x2−x1)/2, a minor axis is b=(y2−y1)/2, x coordinate of a center point is tx=(x1+x2)/2, y coordinate of the center point is ty=(y1+y2)/2, and a dual quadratic form of the external ellipse is as follows.

$$C^* = \begin{bmatrix} 1 & 0 & t_x \\ 0 & 1 & t_y \\ 0 & 0 & 1 \end{bmatrix} \begin{bmatrix} \frac{1}{a^2} & 0 & 0 \\ 0 & \frac{1}{b^2} & 0 \\ 0 & 0 & -1 \end{bmatrix} \begin{bmatrix} 1 & 0 & t_x \\ 0 & 1 & t_y \\ 0 & 0 & 1 \end{bmatrix}^T = \begin{bmatrix} \frac{16-(x_2^2-x_1^2)^2}{4(x_2-x_1)^2} & -\frac{(x_1+x_2)(y_1+y_2)}{4} & -\frac{x_1+x_2}{2} \\ -\frac{(x_1+x_2)}{4} & \frac{16-(y_1^2-y_2^2)^2}{4(y_2-y_1)^2} & -\frac{y_1+y_2}{2} \\ -\frac{x_1+x_2}{2} & -\frac{y_1+y_2}{2} & -1 \end{bmatrix}$$

Where, a vector of 6 independent elements of the dual quadratic form of the external ellipse is expressed as follows.

$$c^* = \begin{bmatrix} \frac{16-(x_2^2-x_1^2)^2}{4(x_2-x_1)^2} \\ -\frac{(x_1+x_2)(y_1+y_2)}{4} \\ -\frac{x_1+x_2}{2} \\ \frac{16-(y_1^2-y_2^2)^2}{4(y_2-y_1)^2} \\ -\frac{y_1+y_2}{2} \\ -1 \end{bmatrix}$$

Step S152, based on the odometer pose of multi-sensor system, as well as the dual vector and semantic information corresponding to each semantic region, determining a projection matrix of the same external ellipse fitted among respective depth image frames, and determining an object-enveloped map for object images based on the projection matrix.

Reference may be made to FIG. 8, which is a flow chart of determining a projection matrix of an external ellipse according to an exemplary embodiment of the present disclosure. In the step S152, the process in which the server determines a projection matrix of the same external ellipse fitted among respective depth image frames based on the odometer pose of multi-sensor system, as well as the dual vector and semantic information corresponding to each semantic region, may be specifically implemented in the following manner.

Operation c1, determining an overlapping inlier of the same external ellipse fitted among respective depth image frames according to odometer pose of multi-sensor system.

In accordance with some embodiments, the server needs to perform, based on the odometer pose of multi-sensor system, a cross-frame semantic association among respective depth image frames to determine an overlapping inlier of the same external ellipse fitted among respective depth image frames. Data association refers to semantically associating segmented images corresponding to the same object in different image frames, in order to obtain multi-view geometric information of each semantic region, and to enable accurate 3D geometric construction. Due to joint influences of 3D rigid body motion of sensing devices and projective transformation of camera, coupled with interference such as occlusion and limited field of view, coordinates of a projected outline of an object in the view change drastically, and it is difficult to track and associate using a simple motion model.

In accordance with some embodiments, the server obtains external ellipse fitting data of each semantic region and semantic information in an object image corresponding to the each semantic region, and records segmentation result data of an (i−1)-th frame as $\{C_{i-1,k}^*, l_n\}$, where ln is a numbering of a semantic tag referring to a certain class of objects. Then, the server determines, according to semantic association relationships of point cloud points and pixels in the object image, all point cloud points in the k-th external ellipse in the (i−1)-th frame $$C_{i-1,k}^*$$

those associate with respective pixels with a label of ln. Further, according to a camera imaging model and pose transformation Ri and ti from the (i−1)-th frame to the i-th frame, the server projects associated point cloud points onto the i-th depth image frame. Then, the server calculates the degree of coincidence between the projected discrete pixels and segmentation result data $$\{C_{i,k}^*, l_n\}$$

in the i-th frame, that is, calculating a quantity of projected pixels which fall within an ellipse corresponding to a same tag in the i-th depth image frame, thereby marking overlapping inliers and overlapping outliers in the i-th depth image frame. Lastly, the server calculates a ratio of overlapping inliers to determine an association manner for external ellipses across frames.

In accordance with some embodiments, overlapping inliers are pixels with the same semantic information across depth image frames.

Operation c2, according to overlapping inliers of depth image frames and dual vectors of corresponding external ellipses, determining a projection matrix of the same external ellipse fitted among depth image frames.

In one embodiment, the server determines a projection matrix of the same external ellipse fitted among depth image frames, that is, performing an estimation of 3D envelop body of the same object image among depth image frames. In a dual form of the external ellipse, an ellipsoid can be portrayed by a 4×4 symmetric matrix. In order to realize an initialization estimation of 3D envelop ellipsoid, a projection function in multiple views of the ellipsoid in a dual form may be:

$$\lambda_i C_i^* = P_i Q^* P_i^T$$

Where, subscript i in the formula indicates that measurement of an object is related to an i-th view, $$C_i^*$$

in the formula refers to a dual representation of an ellipse of an object image in the i-th view corresponding to an ellipsoid to be estimated, and $P_i=K[R_i\ t_i]$ is a projection matrix which is composed by a camera intrinsic matrix K and camera pose Ri and ti, and λi is an unknown scale scalar. If to express Pi in a quadratic form to obtain Bi, then the formula may be written in a vector form as follows.

$$\lambda_i \begin{bmatrix} c_{i_1}^* \\ \vdots \\ c_{i_6}^* \end{bmatrix} = B_i \begin{bmatrix} q_1^* \\ \vdots \\ q_{10}^* \end{bmatrix}$$

Further, join multiple semantic ellipses from multiple views (at least three views) to form a system of equations:

$$\begin{bmatrix} B_1 & c_1^* & 0 & \dots & 0 \\ B_2 & 0 & c_2^* & \dots & 0 \\ \vdots & \vdots & \vdots & \vdots & \vdots \\ B_n & 0 & \dots & \dots & c_n^* \end{bmatrix} \begin{bmatrix} q_1^* \\ \vdots \\ q_{10}^* \\ \lambda_1 \\ \vdots \\ \lambda_n \end{bmatrix} = 0$$

Where, $$c_n^*$$

is a dual vector of a semantic ellipse in the n-th view of an ellipsoid Q*to be estimated, namely $$c_n^* = \left[c_{n_1}^*, \dots, c_{n_6}^*\right]^T.$$

The system of equations may be solved by using singular value decomposition, and the first 10 elements of a singular vector corresponding to a smallest singular value are 10 independent elements of a dual ellipsoid to be solved. The 10 independent elements may be sorted into a matrix form as follows.

$$Q^* = \begin{bmatrix} q_1^* & q_2^* & q_3^* & q_4^* \\ q_2^* & q_5^* & q_6^* & q_7^* \\ q_3^* & q_6^* & q_8^* & q_9^* \\ q_4^* & q_7^* & q_9^* & q_{10}^* \end{bmatrix}$$

Where, Q*is a dual matrix form of a minimum 3D envelop ellipsoid of a semantic object, so far as to complete the projection matrix of the same external ellipse fitted among depth image frames (that is, an initialization estimation of 3D envelop of the same object among depth image frames).

In other embodiments, when the server completes the projection matrix representation of the same external ellipse, as observation views (that is, the depth images) increase and observation angle (the sensor's shooting angle of the current scene) changes, the 3D envelop body is provided with more geometric constraints. Therefore, the server needs to perform fusion optimization for newly observed and newly fitted semantic ellipses to obtain a more accurate estimation of the 3D envelop ellipsoid. In order to achieve this objective, an optimized cost function needs to be constructed, that is, for the estimated ellipsoid $$Q_i^*,$$

an elliptical projection in a new observation view j is calculated, and a similarity with an actual semantic segmentation fitting result in the view j is measured. This cost function is a specific representation of projection errors on the ellipsoid. The specific function of which is:

$$e_{ij} = b_{ij} - BBox\left(P_j Q_i^* P_j^T\right).$$

Where, bij represents pixel coordinates of an upper left corner and a lower right corner of a fitted envelop rectangular box of an object corresponding to an ellipsoid i in the view j, and the function BBox(•) is used for 2D envelop box extraction of an ellipse projected by an ellipsoid $Q_i$*in the view j. In view of multiple new observation views, an optimization function for the ellipsoid is as follows.

$$\arg\min_{Q_i^*} \sum_{i,j} \|e_{ij}\|^2$$

Where, a parameter of the ellipsoid is optimized by the optimization function. The server uses Levenberg-Maquardt algorithm to iterate through minimized errors to obtain an optimized ellipsoid, thereby achieving accurate 3D envelop of the object.

For the above solution, on the one hand, projecting the 3D point cloud data onto a corresponding image plane, and semantically associating 3D point cloud data with pixels of the scene image in order to obtain a depth image used for map generation at a later stage, allows pixels in the depth image to be reliable at semantically associating with point cloud points in the depth image, which further enables the point cloud map and the object-enveloped map generated at a subsequent stage to be more recognizable and robust. On the other hand, the semantic map may be able to represent more information of a scene when it is eventually fused by the object-enveloped map for respective object images and a point cloud map for the depth image, such that an application of the semantic map is broadened for higher-level tasks, including tasks of semantic navigation, environment portrayal, intelligent operation, and the like.

It is to be understood that, operations in the flow charts in FIG. 2 to FIG. 8 are displayed in sequence based on indication of arrows, but these operations are not necessarily executed sequentially based on the sequence indicated by the arrows. Unless otherwise explicitly specified in the disclosure, sequence to execute the operations is not strictly limited, and the operations may be executed in other sequences. In addition, at least some operations in FIG. 2 to FIG. 8 may include multiple operations or multiple stages, and these operations or stages are not necessarily executed at the same moment, but may be executed at different moments. These operations or stages are not necessarily executed in sequence, but may be executed in turn or alternately with another operation or at least some of operations or stages of another operation.

It may be understood that, same or similar parts among the embodiments of the above-mentioned method in the specification may make references to each other. Focus of each embodiment is placed on parts that differ from other embodiments, and relevant parts may be referred by descriptions of other embodiments of the method.

Figure 9:
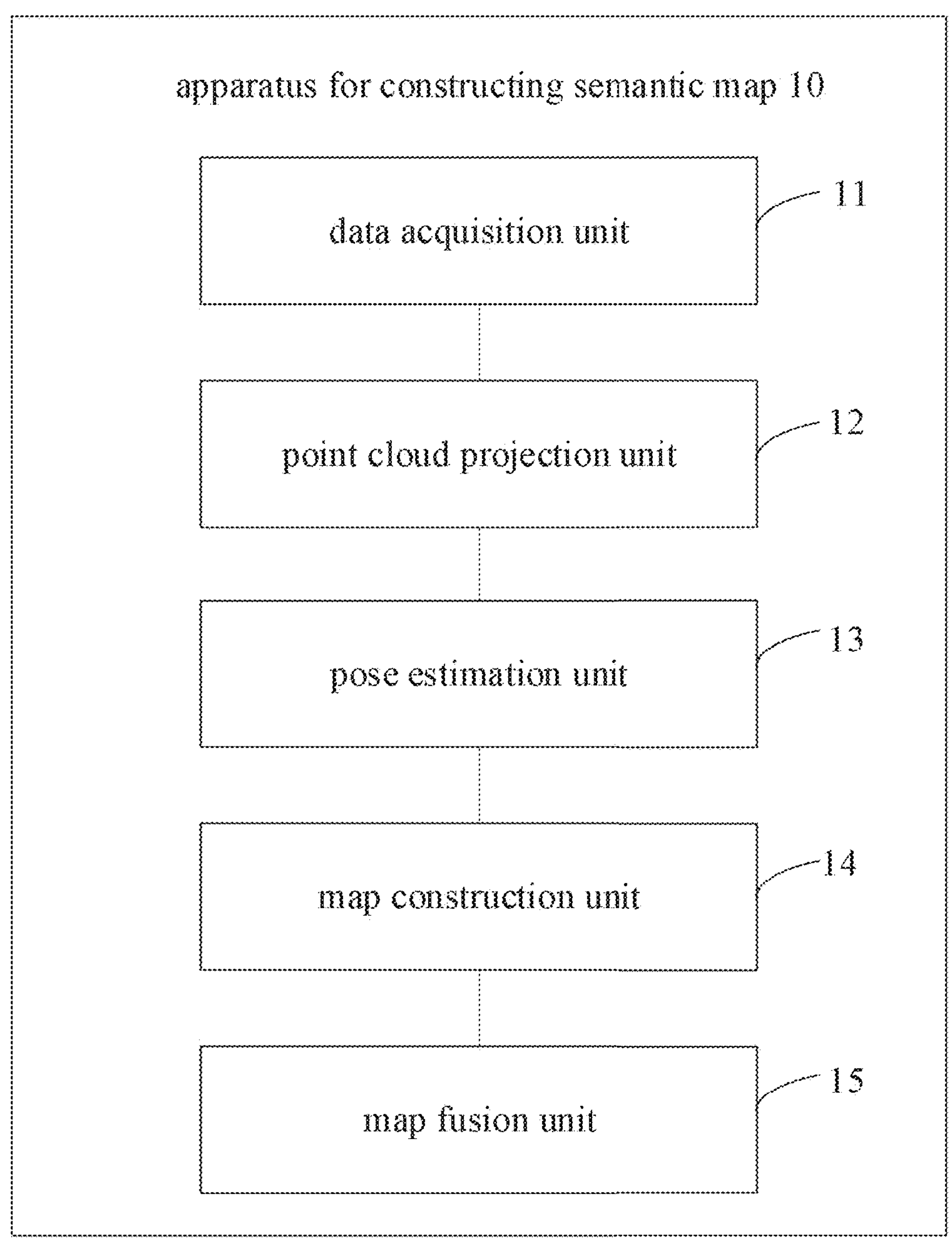
FIG. 9 is a block diagram of an apparatus of hierarchical semantic mapping based on deep-learning perception according to an embodiment.

FIG. 9 is a block diagram of an apparatus of hierarchical semantic mapping based on deep-learning perception provided by an embodiment of the present disclosure. Referring to FIG. 9, the apparatus 10 of hierarchical semantic mapping based on deep-learning perception includes: a data acquisition unit 11, a point cloud projection unit 12, a pose estimation unit 13, a map construction unit 14 and a map fusion unit 15.

The data acquisition unit 11, which is configured to obtain 3D point cloud data of a current scene and a scene image of the current scene captured by multi-sensor system, and motion state data of the multi-sensor system during capturing.

The point cloud projection unit 12, which is configured to execute the projection of the 3D point cloud data onto a corresponding image plane to obtain a depth image for the current scene; the depth image includes multiple semantic regions, where different semantic regions represent different object images, and 3D point cloud data projected in each of the semantic regions is semantically associated with corresponding pixels in the scene image.

The pose estimation unit 13, which is configured to execute a point cloud registration process and a pose prediction process, on semantically associated 3D point cloud data and the motion state data to obtain an odometer pose related to the multi-sensor system.

The map construction unit 14, which is configured to execute the generation of a point cloud map for the depth image, based on semantically associated 3D point cloud data and the odometer pose of multi-sensor system; in addition, based on the depth image and the odometer pose of multi-sensor system, the map construction unit is configured to perform an external ellipse fitting process on each semantic region in the depth image to obtain an object-enveloped map for respective object images.

The map fusion unit 15, which is configured to execute a coordinate alignment of the point cloud map and the object-enveloped map according to a configuration of coordinate system extrinsic parameters of multi-sensor system, and fusing the coordinately aligned point cloud map and object-enveloped map into a semantic map.

In accordance with some embodiments, the apparatus 10 of hierarchical semantic mapping based on deep-learning perception is specifically used for the following purposes.

Perform semantic segmentation on the scene image to determine multiple segmented regions.

Inversely project respective point cloud points that correspond to 3D point cloud data onto a corresponding image plane where the multiple segmented regions are located, to semantically associate respective projected point cloud points with pixels on the corresponding image plane, and to generate the depth image.

In accordance with some embodiments, the apparatus 10 of hierarchical semantic mapping based on deep-learning perception is specifically used for the following purposes.

Perform feature extraction of semantically associated 3D point cloud data to obtain edge feature points and plane feature points projected from multiple point cloud frames onto corresponding depth image frames.

Determine an incremental odometer pose of an inertial measurement unit according to orientation information and position information captured by the inertial measurement unit.

Perform a point cloud registration process on respective edge feature points correspondingly projected from multiple cloud point frames and respective plane feature points correspondingly projected from multiple cloud point frames to obtain a laser odometer pose related to the multi-line LiDAR.

Perform pose prediction processing respectively on the incremental odometer poses and the laser odometer poses, and obtain odometer pose of the multi-sensor system.

In accordance with some embodiments, the apparatus 10 of hierarchical semantic mapping based on deep-learning perception is specifically used for the following purposes.

Determine a curvature of each point cloud curve corresponding to the semantically associated 3D point cloud data; each point cloud curve is composed by multiple point cloud points.

Perform a consistency check on each point cloud curve, and determine a beam distance between a point cloud point and a neighboring point cloud point of the point cloud point on each point cloud curve.

Perform feature extraction on a first point cloud point having a light beam distance smaller than a preset distance, and determine a feature point type of the first point cloud point after projection. Types of the feature points include edge feature points and plane feature points.

In accordance with some embodiments, the apparatus 10 of hierarchical semantic mapping based on deep-learning perception is specifically used for the following purposes.

Perform feature matching for respective edge feature points in the multiple point cloud frames according to nearest neighbor rule, to obtain a first nearest point of a previous point cloud frame corresponding to an edge feature point in each point cloud frame, and a second nearest point located on a neighboring line beam to a line beam where the first nearest point is located; in addition, perform feature matching for respective plane feature points in multiple point cloud frames according to nearest neighbor rule, to obtain a third nearest point of a previous point cloud frame corresponding to a plane feature point in each point cloud frame, and a fourth nearest point located on the same line beam as the third nearest point.

Perform semantic consistency checks respectively on each edge feature point with the corresponding first nearest point, and on each edge feature point with the corresponding second nearest point to determine a first class of feature points having consistent semantic information with the corresponding first nearest point and the corresponding second nearest point; in addition, perform semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point.

Determine a first distance between each of the first class of feature points and a line segment formed by the corresponding first nearest point and the corresponding second nearest point; in addition, determine a second distance between each of the second class of feature points and a plane formed between the corresponding third nearest point and the corresponding fourth nearest point.

Obtain a laser odometer pose of a multi-line LiDAR according to an optimal solution of a target function corresponding to the first distance and the second distance.

In accordance with some embodiments, the apparatus 10 of hierarchical semantic mapping based on deep-learning perception is specifically used for the following purposes.

Based on an image coordinate system of the each depth image frame, an external ellipse fitting process is performed on the each semantic region in the each depth image frame to obtain a dual vector of an external ellipse of the each semantic region and semantic information.

Based on the odometer pose of multi-sensor system, as well as the dual vector and semantic information corresponding to each semantic region, determine a projection matrix of the same external ellipse fitted among respective depth image frames, and determine the object-enveloped map for object images based on the projection matrix.

In accordance with some embodiments, the apparatus 10 of hierarchical semantic mapping based on deep-learning perception is specifically used for the following purposes.

Determine an overlapping inlier of the same external ellipse fitted among the respective depth image frames according to odometer pose of the multi-sensor system; overlapping inliers are pixels with the same semantic information across depth image frames.

According to overlapping inliers of the depth image frames and dual vectors of the corresponding external ellipses, determine a projection matrix of the same external ellipse fitted among the depth image frames.

For the apparatus in the above-mentioned embodiment, as detailed descriptions of specific methods to execute operations of each module in the apparatus are already provided in an embodiment relevant to the methods thereof, detailed illustrations of similar contents are not to be presented here.

As what are used in the present disclosure, a technical term such as "component", "module", "system" that is used to describe a computer related entity may be a piece of hardware, a combination of a piece of hardware and software, a piece of software or a piece of software that is being executed. For example, a component may be but not limited to a running process on a processor, a processor, an object, a piece of executable code, an executed thread, a program and/or a computer. As an instruction, an application program running on a server and a server both can be a component. One or more components may be residing in a process and/or an executed thread, and the component may be located inside a computer and/or distributed among two or more computers.

Figure 10:
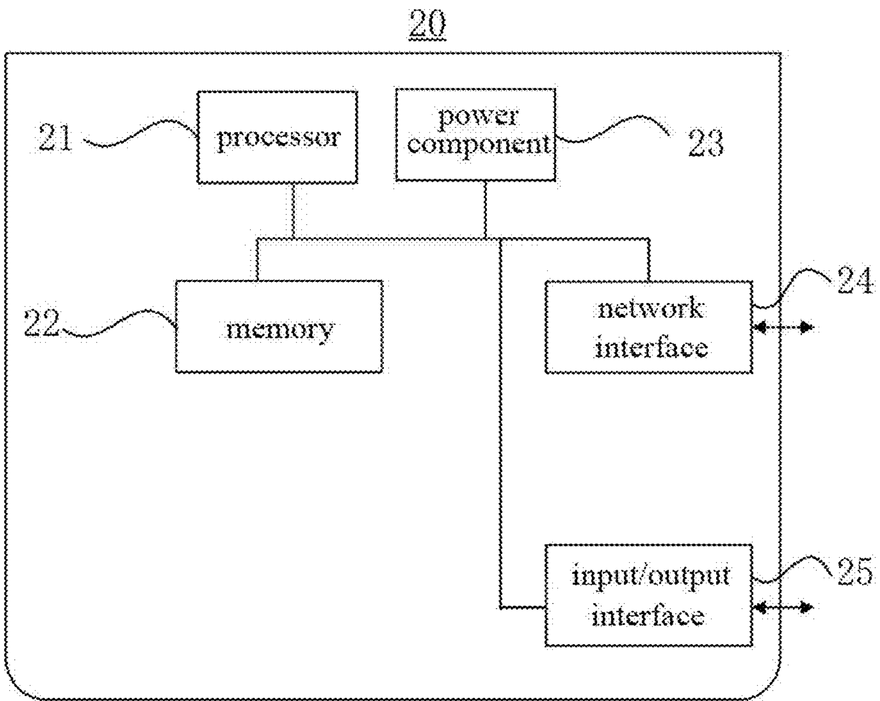
FIG. 10 is a block diagram of an electronic device of hierarchical semantic mapping based on deep-learning perception according to an embodiment.

FIG. 10 is a block diagram of a server provided by an embodiment of the present disclosure. For example, a server 20 may be a type of electronic device, an electrical component, or a server array and so forth. Referring to FIG. 10, the server 20 includes a processor 21 which may further be a set of processors that may include one or more processors 21, and the server 20 includes memory resources represented by a memory 22, where a computer program such as an application program is stored in the memory 22. The computer program stored in the memory 22 may include one or more modules, each of which corresponds to a group of executable instructions. In addition, the processor 21 is configured to execute a computer program that achieves an above-mentioned method of hierarchical semantic mapping based on deep-learning perception.

In accordance with some embodiments, the server 20 is an electronic device, and computing systems in the electronic device may run one or more operating systems, including any operating systems discussed above and any commercially available server operating systems. The server 20 may also run any one of a variety of additional server applications and/or mid-tier applications, including HTTP (Hypertext Transport Protocol) servers, FTP (File Transfer Protocol) servers, CGI (Common Gateway Interface) servers, super servers, database servers, and the like. Exemplary database servers may include but not limited to database servers commercially purchased from IBM (International Business Machines), and the like.

In accordance with some embodiment, the processor 21 normally controls the overall operation of the server 20, such as operations associated with display, data processing, data communication, and logging operations. The processor 21 may include one or more processors to execute a computer program to complete all or some of the steps of the above-mentioned method. In addition, the processor 21 may include one or more modules to facilitate an interaction between the processor 21 and other components. For example, the processor 21 may include a multimedia module to facilitate controlling an interaction between user server 20 and processor 21 by using the multimedia module.

In accordance with some embodiments, the processor 21 may also be called CPU (Central Processing Unit). The processor 21 may be one type of electronic chip with a capacity for signal processing. The processor 21 may further be a general purpose processor, a DSP (Digital Signal Processor), an ASIC (Application Specific Integrated Circuit), a FPGA (Field-Programmable Gate Array) or other programmable logic devices, a discrete gate or a transistor logic device, a discrete hardware component. The general purpose processor may be a micro-processor or the processor 21 may be any regular processors, and the like. In addition, the processor may be jointly implemented by integrated circuit chips.

In accordance with some embodiments, the memory 22 is configured to store a variety of data to support server operations. Examples of these data include instructions, captured data, information, images, videos etc. of any application programs or methods that may be operated on the server 20. The memory 22 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash EEPROM, a disk, an optical disc, or a graphene memory.

In accordance with some embodiments, the memory 22 may be a memory bank, a TF (Trans-Flash) card, etc., and may store all information in the server 20, including input raw data, computer programs, intermediate running results and final running results which are all stored in the memory 22. In accordance with some embodiments, the memory stores and retrieves information according to a location designated by the processor. In accordance with some embodiments, only can the server 20 possess a memory function and ensure normal operation when the memory 22 exists. In accordance with some embodiments, the memory 22 of the server 20 may be divided into a main memory (internal memory) and an auxiliary memory (external memory) based on its usage, and there may also be a dividing method to divide it into an external memory and an internal memory. The external memory is normally a magnetic medium or an optical disc etc., and may be able to store information in a long term. The internal memory refers to a memory component on the mainboard, and is used to store data and programs that are presently being executed, but it may only be used to temporarily store the programs and data. Data will be lost when the power supply is turned off or cut off.

In accordance with some embodiments, the server 20 may further includes: a power management configured by a power component 23 to execute the server 20, a wired or wireless network interface 24 configured to connect the server 20 to the network, and an Input/Output (I/O) interface 25. The server 20 may operate an operating system, such as Windows Server, Mac OS X, Unix, Linux, FreeBSD or the like, that is stored in the memory 22.

In accordance with some embodiments, a power component 23 may provide power to various components of the server 20. The power component 23 may include a power management system, one or more power sources, and any other components associated with the generation, management, and distribution of power in the server 20.

In accordance with some embodiments, the wired or wireless network interface 24 is configured to facilitate wired or wireless communication between the server 20 and other devices. The server 20 may access wireless network based on a communication standard, such as WiFi, network from an operator (i.e., 2G, 3G, 4G or 5G), or combinations thereof.

In accordance with some embodiments, the wired or wireless network interface 24 receives a broadcast signal or broadcast related information from an external broadcast management system via a broadcast channel. In an exemplary embodiment, the wired or wireless network interface 24 further includes a Near Field Communication (NFC) module, to facilitate short-range communication. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In accordance with some embodiments, the Input/Output (I/O) interface 25 provides an interface for the processor 21 and a peripheral interface module. The above-mentioned peripheral interface module may be a keyboard, a click wheel, a button etc. These buttons may include but not limited to a homepage button, a volume button, a start button and a lock button.

Figure 11:
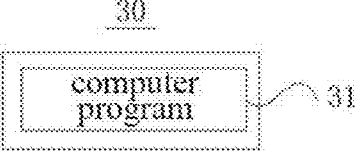
FIG. 11 is a block diagram of a computer readable storage medium associated with hierarchical semantic mapping based on deep-learning perception according to an embodiment.

FIG. 11 is a block diagram of a computer-readable storage medium 30 provided by an embodiment of the present disclosure. The computer-readable storage medium 30 stores a computer program 31, where the computer program 31 is executed by the processor to implement the above-mentioned method of hierarchical semantic mapping based on deep-learning perception.

When a unit, which is integrated by each functional unit in each embodiment of the present disclosure, is implemented in a form of a software function unit and is sold or used as an independent product, such an integrated unit may be stored in a computer-readable storage medium 30. Based on such understanding, an essence of the technical solution of the present disclosure, or a contributing part of the technical solution, or an entirety or a part of the technical solution may be implemented in a form of a software product. The computer-readable storage medium 30 is in a computer program 31, and includes several instructions for instructing a computer device (which may be a personal computer, a system server, a network device, or the like), an electronic device (e.g., MP3, MP4 and the like, which may also be a cellphone, a tablet personal computer, a wearable device and other intelligent terminals, or a desktop computer and the like) or a processor to perform all or some of the operations of the methods in the embodiments of the present disclosure.

Figure 12:
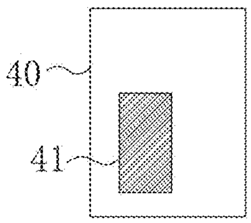
FIG. 12 is a block diagram of a computer program product of hierarchical semantic mapping based on deep-learning perception according to an embodiment.

FIG. 12 is a block diagram of a computer program product 40 provided by an embodiment of the present disclosure. The computer program product 40 includes a program instruction 41. The program instruction 41 is executed by the processor of the server 20 to implement the above-mentioned method of hierarchical semantic mapping based on deep-learning perception.

It should be understood by those skilled in the art that the embodiments of the present disclosure can be provided as a method of hierarchical semantic mapping based on deep-learning perception, an apparatus 10, a server 20, a computer-readable storage medium 30 or a computer program product 40 of hierarchical semantic mapping based on deep-learning perception. Therefore, the present disclosure may adopt a form of hardware-only embodiments, software-only embodiments, or embodiments with a combination of software and hardware. Moreover, the present disclosure may adopt a form of a computer program product 40 that is implemented on one or more computer program instructions 41 (including but not limited to a disk memory, a CD-ROM, an optical memory, etc.) that include computer-usable program codes.

Other implementation solutions of the present disclosure will be apparent to those skilled in the art after considering the specification and practice of the disclosure presented here. This disclosure is intended to cover any variations, usages, or adapted changes of the present disclosure. These variations, usages or adapted changes abide by general principles of the present disclosure and include common general knowledge or conventional technical means in the present technical field undisclosed by the present disclosure. The specification and embodiments should be considered as exemplary only. True scope and spirit of the present disclosure are indicated by the claims.

It should be understood that the present disclosure is not limited to exact structures that have been described above and illustrated in the accompanying drawings, and that various modifications and changes may be made without departing from the scope thereof. It is intended that the scope of the present disclosure only be limited by the appended claims.

What is claimed is:

1. A method for constructing hierarchical semantic map based on deep-learning based perception, comprising:

obtaining 3D point cloud data of a current scene and a scene image of the current scene which are captured by a multi-sensor system, and motion state data of the multi-sensor system during capturing;

projecting the 3D point cloud data onto a corresponding image plane to obtain a depth image for the current scene; wherein the depth image comprises a plurality of semantic regions, different semantic regions represent different object images, and 3D point cloud data projected in each of the semantic regions is semantically associated with corresponding pixels in the scene image;

performing a point cloud registration process and a pose prediction process on semantically associated 3D point cloud data and the motion state data to obtain an odometer pose related to the multi-sensor system;

generating a point cloud map for the depth image based on semantically associated 3D point cloud data and the odometer pose of the multi-sensor system, and performing, based on the depth image and the odometer pose of the multi-sensor system, an external ellipse fitting process on each semantic region in the depth image to obtain an object-enveloped map for respective object images; and performing a coordinate alignment of the point cloud map and the object-enveloped map according to a configuration of coordinate system extrinsic parameters of the multi-sensor system, and fusing the coordinately aligned point cloud map and object-enveloped map into a semantic map.

2. The method of claim 1, wherein the projecting the 3D point cloud data onto a corresponding image plane to obtain a depth image for the current scene comprises:

performing semantic segmentation on the scene image to determine a plurality of segmented regions; and inversely projecting respective point cloud points that correspond to 3D point cloud data onto a corresponding image plane where the plurality of segmented regions are located, semantically associating respective projected point cloud points with pixels on the corresponding image plane, and generating the depth image.

3. The method of claim 1, wherein the multi-sensor system comprises a multi-line LiDAR and an inertial measurement unit; the 3D data is captured by the multi-line LiDAR, and the 3D point cloud data after semantic association comprises a plurality of point cloud frames corresponding to a plurality of consecutive depth image frames; the motion state data comprises orientation information and position information captured by the inertial measurement unit during a preset time domain;

wherein the performing a point cloud registration process and a pose prediction process on semantically associated 3D point cloud data and the motion state data to obtain an odometer pose related to the multi-sensor system comprises:

performing feature extraction of semantically associated 3D point cloud data to obtain edge feature points and plane feature points projected from a plurality of point cloud frames onto corresponding depth image frames;

determining an incremental odometer pose of the inertial measurement unit according to the orientation information and the position information captured by the inertial measurement unit;

performing a point cloud registration process on respective edge feature points correspondingly projected from the plurality of cloud point frames and respective plane feature points correspondingly projected from the plurality of cloud point frames to obtain a laser odometer pose related to the multi-line LiDAR; and obtaining the odometer pose related to the multi-sensor system by performing pose prediction processing on the incremental odometer pose and the laser odometer pose respectively.

4. A server, comprising:

a processor;

a memory, which stores an executable instruction of the processor;

wherein, the processor is configured to execute the executable instruction for performing the method for constructing hierarchical semantic map based on deep-learning based perception according to claim 1.

5. A computer readable storage medium, comprising program data, wherein the program data, when executed by a processor of a server, causes the server to perform the method for constructing hierarchical semantic map based on deep-learning based perception according to claim 1.

6. The method of claim 3, wherein the performing feature extraction of semantically associated 3D point cloud data to obtain edge feature points and plane feature points projected from a plurality of point cloud frames onto corresponding depth image frames comprises:

determining a curvature of each point cloud curve corresponding to the semantically associated 3D point cloud data; each point cloud curve is composed by a plurality of point cloud points;

performing a consistency check on each point cloud curve, and determining a beam distance between a point cloud point and a neighboring point cloud point of the point cloud point on each point cloud curve;

performing feature extraction on a first point cloud point having a light beam distance smaller than a preset distance, and determining a feature point type of the first point cloud point after projection; types of the feature points comprise edge feature points and plane feature points.

7. The method of claim 3, wherein the performing a point cloud registration process on respective edge feature points correspondingly projected from the plurality of cloud point frames and respective plane feature points correspondingly projected from the plurality of cloud point frames to obtain a laser odometer pose related to the multi-line LiDAR comprises:

performing feature matching for respective edge feature points in the plurality of point cloud frames according to nearest neighbor rule, to obtain a first nearest point of a previous point cloud frame corresponding to an edge feature point in each point cloud frame, and a second nearest point located on a neighboring line beam to a line beam where the first nearest point is located, and performing feature matching for respective plane feature points in a plurality of point cloud frames according to nearest neighbor rule, to obtain a third nearest point of a previous point cloud frame corresponding to a plane feature point in each point cloud frame, and a fourth nearest point located on the same line beam as the third nearest point;

performing semantic consistency checks respectively on each edge feature point with the corresponding first nearest point, and on each edge feature point with the corresponding second nearest point to determine a first class of feature points having consistent semantic information with the corresponding first nearest point and the corresponding second nearest point, and performing semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point;

determining a first distance between each of the first class of feature points and a line segment formed by the corresponding first nearest point and the corresponding second nearest point, and determining a second distance between each of the second class of feature points and a plane formed between the corresponding third nearest point and the corresponding fourth nearest point; and obtaining a laser odometer pose of the multi-line LiDAR according to an optimal solution of a target function corresponding to the first distance and the second distance.

8. The method of claim 3, wherein the performing, based on the depth image and the odometer pose of the multi-sensor system, an external ellipse fitting process on each semantic region in the depth image to obtain an object-enveloped map for respective object images comprises:

based on an image coordinate system of the each depth image frame, performing an external ellipse fitting process on the each semantic region in the each depth image frame to obtain a dual vector of an external ellipse of the each semantic region and semantic information; and based on the odometer pose of the multi-sensor system, as well as the dual vector and semantic information corresponding to the each semantic region, determining a projection matrix of the same external ellipse fitted among the respective depth image frames, and determining an object-enveloped map for the object images based on the projection matrix.

9. The method of claim 8, wherein based on the odometer pose of the multi-sensor system, as well as the dual vector and semantic information corresponding to the each semantic region, determining a projection matrix of the same external ellipse fitted among respective depth image frames, and determining the object-enveloped map for object images based on the projection matrix comprises:

determining an overlapping inlier of the same external ellipse fitted among the respective depth image frames according to odometer pose of the multi-sensor system; overlapping inliers are pixels with the same semantic information across depth image frames; and according to overlapping inliers of the depth image frames and dual vectors of the corresponding external ellipses, determining a projection matrix of the same external ellipse fitted among the depth image frames.

10. An apparatus for constructing hierarchical semantic map based on deep-learning based perception, comprising:

a data acquisition unit, which is configured to obtain 3D point cloud data of a current scene and a scene image of the current scene which are captured by a multi-sensor system, and motion state data of the multi-sensor system during capturing;

a point cloud projection unit, which is configured to: project the 3D point cloud data onto a corresponding image plane to obtain a depth image for the current scene; wherein the depth image comprises a plurality of semantic regions, different semantic regions represent different object images, and 3D point cloud data projected in each of the semantic regions is semantically associated with corresponding pixels in the scene image;

a pose estimation unit, which is configured to perform a point cloud registration process and a pose prediction process on semantically associated 3D point cloud data and the motion state data to obtain an odometer pose related to the multi-sensor system;

a map construction unit, which is configured to: generate a point cloud map for the depth image based on semantically associated 3D point cloud data and the odometer pose of the multi-sensor system, and perform, based on the depth image and the odometer pose of the multi-sensor system, an external ellipse fitting process on each semantic region in the depth image to obtain an object-enveloped map for respective object images; and a map fusion unit, which is configured to: perform a coordinate alignment of the point cloud map and the object-enveloped map according to a configuration of coordinate system extrinsic parameters of the multi-sensor system, and fuse the coordinately aligned point cloud map and the object-enveloped map into a semantic map.

11. The apparatus of claim 10, wherein the point cloud projection unit further comprises:

a region segmentation unit, which is configured to perform semantic segmentation on the scene image to determine a plurality of segmented regions; and an image generation unit, which is configured to: inversely project respective point cloud points that correspond to 3D point cloud data onto a corresponding image plane where the plurality of segmented regions are located, semantically associate respective projected point cloud points with pixels on the corresponding image plane, and generating the depth image.

12. The apparatus of claim 10, wherein the multi-sensor system comprises a multi-line LiDAR and an inertial measurement unit; the 3D data is captured by the multi-line LiDAR, and the 3D point cloud data after semantic association comprises a plurality of point cloud frames corresponding to a plurality of consecutive depth image frames; the motion state data comprises orientation information and position information captured by the inertial measurement unit during a preset time domain; the pose estimation unit further comprises:

a feature extraction unit, which is configured to perform feature extraction of semantically associated 3D point cloud data to obtain edge feature points and plane feature points projected from a plurality of point cloud frames onto corresponding depth image frames;

a first odometer unit, which is configured to determine an incremental odometer pose of the inertial measurement unit according to the orientation information and the position information captured by the inertial measurement unit;

a second odometer unit, which is configured to perform a point cloud registration process on respective edge feature points correspondingly projected from the plurality of cloud point frames and respective plane feature points correspondingly projected from the plurality of cloud point frames to obtain a laser odometer pose related to the multi-line LiDAR; and a third odometer unit, which is configured to obtain the odometer pose of the multi-sensor system by performing pose prediction processing on the incremental odometer pose and laser odometer pose respectively.

13. The apparatus of claim 12, wherein the feature extraction unit further comprises:

a curvature checking unit, which is configured to determine a curvature of each point cloud curve corresponding to the semantically associated 3D point cloud data, wherein each point cloud curve is composed by a plurality of point cloud points;

a first distance checking unit, which is configured to: perform a consistency check on each point cloud curve, and determine a beam distance between a point cloud point and a neighboring point cloud point of the point cloud point on each point cloud curve; and a feature point extraction unit, which is configured to: perform feature extraction on a first point cloud point having a light beam distance smaller than a preset distance, and determine a feature point type of the first point cloud point after projection, wherein types of the feature points include edge feature points and plane feature points.

14. The apparatus of claim 12, wherein the second odometer unit further comprises:

a nearest point checking unit, which is configured to: perform feature matching for respective edge feature points in the plurality of point cloud frames according to nearest neighbor rule, to obtain a first nearest point of a previous point cloud frame corresponding to an edge feature point in each point cloud frame, and a second nearest point located on a neighboring line beam to a line beam where the first nearest point is located, and perform feature matching for respective plane feature points in a plurality of point cloud frames according to nearest neighbor rule, to obtain a third nearest point of a previous point cloud frame corresponding to a plane feature point in each point cloud frame, and a fourth nearest point located on the same line beam as the third nearest point;

a feature point checking unit, which is configured to: perform semantic consistency checks respectively on each edge feature point with the corresponding first nearest point, and on each edge feature point with the corresponding second nearest point to determine a first class of feature points having consistent semantic information with the corresponding first nearest point and the corresponding second nearest point, and perform semantic consistency checks respectively on each plane feature point with the corresponding third nearest point, and on each plane feature point with the corresponding fourth nearest point to determine a second class of feature points having consistent semantic information with the corresponding first nearest point and the corresponding second nearest point;

a second distance checking unit, which is configured to: determine a first distance between each of the first class of feature points and a line segment formed by the corresponding first nearest point and the corresponding second nearest point, and determine a second distance between each of the second class of feature points and a plane formed between the corresponding third nearest point and the corresponding fourth nearest point; and an odometer checking unit, which is configured to obtain a laser odometer pose of the multi-line LiDAR according to an optimal solution of a target function corresponding to the first distance and the second distance.

15. The apparatus of claim 12, wherein the apparatus further comprises:

a fitting processing unit, which is configured to perform an external ellipse fitting process on the each semantic region in the each depth based on an image coordinate system of the each depth image frame to obtain a dual vector of an external ellipse of the each semantic region and semantic information; and a projection unit, which is configured to: determine a projection matrix of the same external ellipse fitted among respective depth image frames based on the odometer pose of the multi-sensor system, as well as the dual vector and semantic information corresponding to each semantic region, and determine the object-enveloped map for object images based on the projection matrix.

* * * * *